US012639556B2

(12) United States Patent
Weissenborn et al.

(10) Patent No.: US 12,639,556 B2
(45) Date of Patent: May 26, 2026

(54) OBJECT-CENTRIC LEARNING WITH SLOT ATTENTION

(71) Applicant: Google LLC, Mountain View, CA (US)

(72) Inventors: Dirk Weissenborn, Berlin (DE); Jakob Uszkoreit, Berlin (DE); Thomas Unterthiner, Berlin (DE); Aravindh Mahendran, Berlin (DE); Francesco Locatello, Hoofddorp (NL); Thomas Kipf, Amsterdam (NL); Georg Heigold, Aachen (DE); Alexey Dosovitskiy, Berlin (DE)

(73) Assignee: Google LLC, Mountain View, CA (US)

( * ) Notice: Subject to any disclaimer, the term of this patent is extended or adjusted under 35 U.S.C. 154(b) by 763 days.

(21) Appl. No.: 16/927,018

(22) Filed: Jul. 13, 2020

(65) Prior Publication Data

US 2021/0383199 A1 Dec. 9, 2021

Related U.S. Application Data

(60) Provisional application No. 63/034,003, filed on Jun. 3, 2020.

(51) Int. Cl.
| | |
|---|---|
| *G06N 3/063* | (2023.01) |
| *G06F 17/16* | (2006.01) |
| *G06N 3/08* | (2023.01) |

(52) U.S. Cl.
CPC ............. *G06N 3/063* (2013.01); *G06F 17/16* (2013.01); *G06N 3/08* (2013.01)

(58) Field of Classification Search
CPC ........... G06N 3/063; G06N 3/08; G06F 17/16
See application file for complete search history.

(56) References Cited

U.S. PATENT DOCUMENTS

| | | |
|---|---|---|
| 2018/0137857 A1 | 5/2018 | Zhou et al. |
| 2019/0221312 A1* | 7/2019 | Al Hasan ............... G06N 3/045 |

(Continued)

FOREIGN PATENT DOCUMENTS

| | | |
|---|---|---|
| CN | 110059323 B | 7/2023 |
| KR | 20200060191 A | 5/2020 |

OTHER PUBLICATIONS

Achlioptas et al., "Learning Representations and Generative Models for 3D Clouds," International Conference on Machine Learning, 2018, pp. 40-49.

(Continued)

*Primary Examiner* — Michelle T Bechtold
*Assistant Examiner* — Moriam Mosunmola Godo
(74) *Attorney, Agent, or Firm* — McDonnell Boehnen Hulbert & Berghoff LLP

(57) ABSTRACT

A method involves receiving a perceptual representation including a plurality of feature vectors, and initializing a plurality of slot vectors represented by a neural network memory unit. Each respective slot vector is configured to represent a corresponding entity in the perceptual representation. The method also involves determining an attention matrix based on a product of the plurality of feature vectors transformed by a key function and the plurality of slot vectors transformed by a query function. Each respective value of a plurality of values along each respective dimension of the attention matrix is normalized with respect to the plurality of values. The method additionally involves determining an update matrix based on the plurality of feature vectors transformed by a value function and the attention matrix, and updating the plurality of slot vectors based on the update matrix by way of the neural network memory unit.

20 Claims, 7 Drawing Sheets

(56) References Cited

U.S. PATENT DOCUMENTS

| | | | | |
|---|---|---|---|---|
| 2020/0410337 | A1* | 12/2020 | Huang | G06N 3/04 |
| 2021/0020296 | A1* | 1/2021 | Sjölund | G16H 50/20 |
| 2021/0034335 | A1* | 2/2021 | Svyatkovskiy | G06F 8/33 |
| 2021/0089867 | A1* | 3/2021 | Byeon | G06N 3/0454 |
| 2021/0201044 | A1* | 7/2021 | Herdade | G06V 20/47 |
| 2021/0303939 | A1* | 9/2021 | Hu | G06V 10/255 |
| 2021/0326742 | A1* | 10/2021 | Rosset | G06F 16/90324 |
| 2022/0043972 | A1* | 2/2022 | Nishida | G06N 3/0445 |

OTHER PUBLICATIONS

Ba et al., "Layer Normalization, Layer Normalization," arXiv preprint arXiv:1607.06450, Jul. 21, 2016, 14 pages.

Bahdanau et al., "Neural Machine Translation by Jointly Learning to Align and Translate," Published as a conference paper at ICLR 2015, arXiv preprint arXiv:1409.0473, 2014, pp. 1-15.

Battaglia et al., "Interaction Networks for Learning about Objects, Relations and Physics," Advances in Neural Information Processing Systems, 2016, pp. 4502-4510.

Battaglia et al., "Relational inductive biases, deep learning, and graph networks," arXiv preprint arXiv:1806.01261, Oct. 17, 2018, pp. 1-40.

Bauckhage, Christian, "Lecture Notes on Data Science: Soft k-Means Clustering," B-IT, University of Bonn, 2016, 6 pages.

Berner et al., "Dota 2 with Large Scale Deep Reinforcement Learning," arXiv preprint arXiv:1912.06680, Dec. 13, 2019, pp. 1-66.

Burgess et al., "MONet: Unsupervised Scene Decomposition and Representation," arXiv preprint arXiv:1901.11390, Jan. 22, 2019, pp. 1-22.

Carion et al., "End-to-End Object Detection with Transformers," arXiv preprint arXiv:2005.12872, May 28, 2020, pp. 1-26.

Chen et al., "Unsupervised Object Segmentation by Redrawing," Advances in Neural Information Processing Systems, 2019, pp. 12705-12716.

Cho et al., "Learning Phrase Representations using RNN Encoder-Decoder for Statistical Machine Translation," arXiv preprint arXiv:1406.1078, Sep. 3, 2014, 15 pages.

Cuturi, Marco, "Sinkhorn Distances: Lightspeed Computation of Optimal Transport," Advances in Neural Information Processing Systems, 2013, pp. 2292-2300.

De Cao et al., "MolGAN: An implicit generative model for small molecular graphs," arXiv preprint arXiv:1805.11973, May 30, 2018, 11 pages.

Devin et al., "Deep Object-Centric Representations for Generalizable Robot Learning," arXiv preprint arXiv:1708.04225, Sep. 26, 2017, 8 pages.

Engelcke et al., "Genesis: Generative Scene Inference and Sampling with Object-Centric Latent Representations," arXiv preprint arXiv:1907.13052, Published as a conference paper at ICLR 2020, Feb. 3, 2020, pp. 1-17.

Eslami et al., "Attend, Infer, Repeat: Fast Scene Understanding with Generative Models," Advances in Neural Information Processing Systems, 2016, pp. 3225-3233.

Everingham et al., "The Pascal Visual Object Classes Challenge: A Retrospective," International Journal of Computer Vision, 2015, pp. 98-136, vol. 111, No. 1.

Fan et al., "A Point Set Generation Network for 3D Object Reconstruction from a Single Image," Proceedings of the IEEE Conference on Computer Vision and Pattern Recognition, 2017, pp. 605-613.

Goodfellow et al., "Generative Adversarial Nets," Advances in Neural Information Processing Systems, 2014, pp. 2672-2680.

Goyal et al., "Accurate, Large Minibatch SGD: Training ImageNet in 1 Hour," arXiv preprint arXiv:1706.02677, Apr. 30, 2018, pp. 1-12.

Goyal et al., "Recurrent Independent Mechanisms," arXiv preprint arXiv:1909.10893, Jul. 2, 2020, pp. 1-33.

Greff et al., "Multi-Object Representation Learning with Iterative Variational Inference," arXiv preprint arXiv:1903.00450, May 15, 2019, 27 pages.

Greff et al., "Neural Expectation Maximization," Advances in Neural Information Processing Systems, 2017, pp. 6692-6701.

Greff et al., "Tagger: Deep Unsupervised Perceptual Grouping," Advances in Neural Information Processing Systems, 2016, pp. 4484-4492.

Gregor et al., "DRAW: A Recurrent Neural Network for Large Generation," arXiv preprint arXiv:1502.04623, May 20, 2015, 10 pages.

He et al., "Deep Residual Learning for Image Recognition," Proceedings of the IEEE conference on Computer Vision and Pattern Recognition, 2016, pp. 770-778.

Hinton et al. "Matrix Capsules with EM Routing," International Conference on Learning Representations, 2018, pp. 1-15.

Huang et al., "Better Set Representations for Relational Reasoning," arXiv preprint arXiv:2003.04448, Jun. 17, 2020, 21 pages.

Hubert et al., "Comparing Partitions," Journal of Classification, 1985, pp. 193-218, vol. 2.

Jacobs et al., "Adaptive Mixtures of Local Experts," Neural Computation, 1991, pp. 79-87, vol. 3.

Johnson et al., "CLEVR: A Diagnostic Dataset for Compositional Language and Elementary Visual Reasoning," Proceedings of the IEEE conference on Computer Vision and Pattern Recognition, 2017, pp. 2901-2910.

Kabra et al., "Multi-Object Datasets," https://github.com/deepmind/multi-object-datasets, 2019, 7 pages.

Kahneman et al., "The Reviewing of Object Files: Object-Specific Integration of Information," Cognitive Psychology, 1992, pp. 175-219, vol. 24.

Kingma et al., "Adam: A Method for Stochastic Optimization," arXiv preprint arXiv:1412.6980, Jan. 30, 2017, pp. 1-15.

Kipf et al., "Constrastive Learning of Structured World Models," arXiv preprint arXiv:1911.12247, Jan. 5, 2020, pp. 1-21.

Kipf et al., "Semi-Supervised Classification with Graph Convolutional Networks," arXiv preprint arXiv:1609.02907, Feb. 22, 2017, pp. 1-14.

Knyazev et al., "Graph Density-Aware Losses for Novel Compositions in Scene Graph Generation," arXiv preprint arXiv:2005.08230, May 17, 2020, pp. 1-17.

Kosiorek et al., "Sequential Attend, Infer, Repeat: Generative Modelling of Moving Objects," Advances in Neural Information Processing Systems, 2018, pp. 8606-8616.

Kuhn, Harold W., "Chapter 2—The Hungarian Method for the Assignment Problem," Naval Research Logistics Quarterly, 1955, pp. 83-97, No. 2, vol. 1-2.

Kulkarni et al., "Unsupervised Learning of Object Keypoints for Perception and Control," Advances in Neural Information Processing Systems, 2019, pp. 10723-10733.

Lecun et al., Convolutional Networks for Images, Speech, and Time-Series, The Handbook of Brain Theory and Neural Networks, 1995, vol. 3361, No. 10.

Lee et al., "Set Transformer: A Framework for Attention-based Permutation-Invariant Neural Networks," arXiv preprint arXiv:1810.00825, May 26, 2019, 17 pages.

Li et al., "Gated Graph Sequence Neural Networks," arXiv preprint arXiv:1511.05493, Published as a conference paper at ICLR 2016, Sep. 22, 2017, pp. 1-20.

Lin et al., "A Structured Self-Attentive Sentence Embedding," arXiv preprint arXiv:1703.0313, Published as a conference paper at ICLR 2017, Mar. 9, 2017, pp. 1-15.

Lin et al., "SPACE: Unsupervised Object-Oriented Scene Representation via Spatial Attention and Decomposition," arXiv preprint arXiv: 2001.02497, Mar. 15, 2020, pp. 1-22.

Locatello et al., "Competitive Training of Mixtures of Independent Deep Generative Models," arXiv preprint arXiv:1804.11130, Mar. 3, 2019, pp. 1-20.

Luong et al., "Effective Approaches to Attention-based Neural Machine Translation," arXiv preprint arXiv:1508.04025, Sep. 20, 2015, 11 pages.

Marino et al., "Iterative Amortized Inference," arXiv preprint arXiv:1807.09356, Jul. 24, 2018, 20 pages.

(56)           References Cited

OTHER PUBLICATIONS

Mnih et al., "Recurrent Models of Visual Attention," Advances in Neural Information Processing Systems, 2014, pp. 2204-2212.

Mrowca et al, "Flexible Neural Representation for Physics Prediction," Advances in Neural Information Processing Systems, 2018, pp. 8799-8810.

Nash et al., "The Multi-Entity Variational Autoencoder," 31st Conference on Neural Information Processing Systems (NIPS 2017), Long Beach, CA, USA, 2017, 8 pages.

Parascandolo et al., "Learning Independent Causal Mechanisms," Proceedings of the 35th International Conference on Machine Learning, 2018, pp. 4036-4044.

Rand, William M., "Objective Criteria for the Evaluation of Clustering Methods," Journal of the American Statistical Association, Dec. 1971, pp. 846-850, vol. 66, No. 336.

Ren et al., "End-to-End Instance Segmentation with Recurrent Attention," Proceedings of the IEEE Conference on Computer Vision and Pattern Recognition, 2017, pp. 6656-6664.

Rezatofighi et al., "Learn to Predict Sets Using Feed-Forward Neural Networks," arXiv preprint arXiv:2001.11845, Jan. 30, 2020, pp. 1-15.

Romera-Paredes et al., "Recurrent Instance Segmentation," arXiv preprint arXiv:1511.08250, Oct. 24, 2016, pp. 1-24.

Sabour et al., "Dynamic Routing Between Capsules," Advances in Neural Information Processing Systems, 2017, pp. 2856-3866.

Sanchez-Gonzalez et al., "Learning to Simulate Complex Physics with Graph Networks," arXiv preprint arXiv:2020.09405, Feb. 21, 2020, 19 pages.

Scarselli et al., "The graph neural network model," IEEE Transactions on Neural Networks, 2009, pp. 61-80, vol. 20, No. 1.

Shaw et al, "Self-Attention with Relative Position Representations," arXiv preprint arXiv:1803.02155, Apr. 12, 2018, 5 pages.

Simonovsky et al., "GraphVAE: Towards Generations of Small Graphs Using Variational Autoencoders," arXiv preprint arXiv:1802.03480, Feb. 9, 2018, 10 pages.

Stelzner et al., "Faster Attend-Infer-Repeat with Tractable Probabilistic Models," Proceedings of the 36th International Conference on Machine Learning, Long Beach, California, 2019, pp. 5966-5975.

Stewart et al., "End-to-End people detection in crowded scenes," Proceedings of the 29th IEEE Conference on Computer Vision and Pattern Recognition, 2016, pp. 2325-2333.

Sun et al., "Stochastic Prediction of Multi-Agent Interactions from Partial Observations," arXiv preprint arXiv:1902.09641, Feb. 25, 2019, pp. 1-15.

Tsai et al., "Capsules with Inverted Dot-Product Attention Routing," arXiv preprint arXiv:2002.04764, Feb. 26, 2020, pp. 1-15.

Van Steenkiste et al., "Investigating Object Compositionality in Generative Adversarial Networks," arXiv preprint arXiv:1810.10340, Dec. 3, 2019, pp. 1-38.

Van Steenkiste et al., "Relational Neural Expectation Maximization: Unsupervised Discovery of Objects and their Interactions," arXiv preprint arXiv:1802.10353, Feb. 28, 2018, pp. 1-15.

Vaswani et al., "Attention Is All You Need," Advances in Neural Information Processing Systems, 2017, pp. 5998-6008.

Vinyals et al., "Grandmaster level in StarCraft II using multi-agent reinforcement learning," Nature, Nov. 14, 2019, pp. 350-354, vol. 575, No. 7782.

Von Kügelgen et al., "Towards Causal Generative Scene Models via Competition of Experts," arXiv preprint arXiv:2004.12906, 2020, pp. 1-20.

Watters et al., "Spatial Broadcast Decoder: A Simple Architecture for Learning Disentangled Representations in VAEs," arXiv preprint arXiv:1901.07017, Aug. 14, 2019, pp. 1-35.

Watters et al., "Visual Interaction Networks: Learning a Physics Simulator from Video," Advances in Neural Information Processing Systems, 2017, pp. 4539-4547.

Yang et al., "Learning to Manipulate Individual Objects in an Image," arXiv preprint arXiv:2004.05495, 2020, pp. 6558-6567.

Yi et al., "CLEVRER: Collision Events for Video Representation and Reasoning," arXiv preprint arXiv: 1910.01442, Mar. 8, 2020, pp. 1-19.

Ying et al., "Hierarchical Graph Representation Learning with Differentiable Pooling," Advances in Neural Information Processing Systems, 2018, pp. 4800-4810.

Zaheer et al., "Deep Sets," Advances in Neural Information Processing Systems, 2017, pp. 3391-3401.

Zeng et al., "DMM-Net: Differential Mask-Matching Network for Video Object Segmentation," Proceedings of the IEEE International Conference on Computer Vision, 2019, pp. 3929-3938.

Zhang et al., "Deep Set Prediction Networks," Advances in Neural Information Processing Systems, 2019, pp. 3207-3217.

Zhang et al., "FSPool: Learning Set Representations with Featurewise Sort Pooling," arXiv preprint arXiv: 1906.02795, May 1, 2020, pp. 1-20.

Chinese Patent Office, Office Action issued on Mar. 8, 2024, in connection with Chinese Patent Application No. 202110619117.8, 13 pages.

* cited by examiner

Front view    Right Side view    Back view

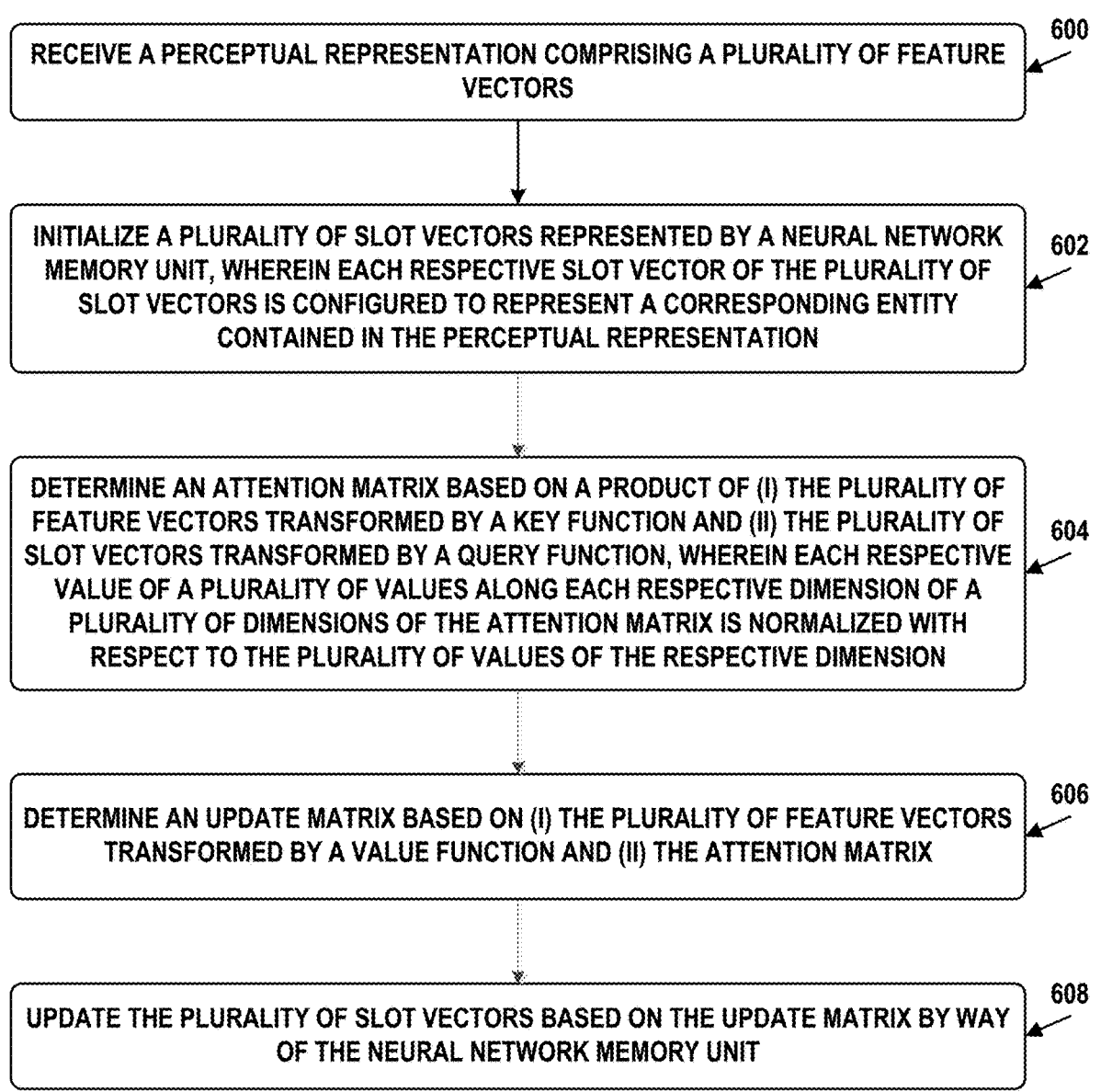

600

RECEIVE A PERCEPTUAL REPRESENTATION COMPRISING A PLURALITY OF FEATURE VECTORS

602

INITIALIZE A PLURALITY OF SLOT VECTORS REPRESENTED BY A NEURAL NETWORK MEMORY UNIT, WHEREIN EACH RESPECTIVE SLOT VECTOR OF THE PLURALITY OF SLOT VECTORS IS CONFIGURED TO REPRESENT A CORRESPONDING ENTITY CONTAINED IN THE PERCEPTUAL REPRESENTATION

604

DETERMINE AN ATTENTION MATRIX BASED ON A PRODUCT OF (I) THE PLURALITY OF FEATURE VECTORS TRANSFORMED BY A KEY FUNCTION AND (II) THE PLURALITY OF SLOT VECTORS TRANSFORMED BY A QUERY FUNCTION, WHEREIN EACH RESPECTIVE VALUE OF A PLURALITY OF VALUES ALONG EACH RESPECTIVE DIMENSION OF A PLURALITY OF DIMENSIONS OF THE ATTENTION MATRIX IS NORMALIZED WITH RESPECT TO THE PLURALITY OF VALUES OF THE RESPECTIVE DIMENSION

606

DETERMINE AN UPDATE MATRIX BASED ON (I) THE PLURALITY OF FEATURE VECTORS TRANSFORMED BY A VALUE FUNCTION AND (II) THE ATTENTION MATRIX

608

UPDATE THE PLURALITY OF SLOT VECTORS BASED ON THE UPDATE MATRIX BY WAY OF THE NEURAL NETWORK MEMORY UNIT

Figure 6

OBJECT-CENTRIC LEARNING WITH SLOT ATTENTION

CROSS-REFERENCE TO RELATED APPLICATIONS

This application claims priority to U.S. provisional patent application No. 63/034,003, filed on Jun. 3, 2020, which is hereby incorporated by reference as if fully set forth in this description.

BACKGROUND

Machine Learning models may be used to process various types of data, including images, time series, text, and/or point clouds, among other possibilities. Improvements in the machine learning models allow the models to carry out the processing of data faster and/or utilize fewer computing resources for the processing.

SUMMARY

In a first example embodiment, a computer-implemented method is provided that includes receiving a perceptual representation that includes a plurality of feature vectors. The computer-implemented method also includes initializing a plurality of slot vectors represented by a neural network memory unit. Each respective slot vector of the plurality of slot vectors may be configured to represent a corresponding entity contained in the perceptual representation. The computer-implemented method additionally includes determining an attention matrix based on a product of (i) the plurality of feature vectors transformed by a key function and (ii) the plurality of slot vectors transformed by a query function. Each respective value of a plurality of values along each respective dimension of a plurality of dimensions of the attention matrix may be normalized with respect to the plurality of values along the respective dimension. The computer-implemented method further includes determining an update matrix based on (i) the plurality of feature vectors transformed by a value function and (ii) the attention matrix. The computer-implemented method yet further includes updating the plurality of slot vectors based on the update matrix by way of the neural network memory unit.

In a second example embodiment, a system is provided that includes a processor and a non-transitory computer-readable storage medium having stored thereon instruction that, when executed by the processor, cause the processor to perform operations. The operations include receiving a perceptual representation that includes a plurality of feature vectors. The operations also include initializing a plurality of slot vectors represented by a neural network memory unit. Each respective slot vector of the plurality of slot vectors may be configured to represent a corresponding entity contained in the perceptual representation. The operations additionally include determining an attention matrix based on a product of (i) the plurality of feature vectors transformed by a key function and (ii) the plurality of slot vectors transformed by a query function. Each respective value of a plurality of values along each respective dimension of a plurality of dimensions of the attention matrix may be normalized with respect to the plurality of values along the respective dimension. The operations further include determining an update matrix based on (i) the plurality of feature vectors transformed by a value function and (ii) the attention matrix. The operations yet further include updating the plurality of slot vectors based on the update matrix by way of the neural network memory unit.

In a third example embodiment, a non-transitory computer-readable storage medium is provided having stored thereon instruction that, when executed by a computing system, cause the computing system to perform operations. The operations include receiving a perceptual representation that includes a plurality of feature vectors. The operations also include initializing a plurality of slot vectors represented by a neural network memory unit. Each respective slot vector of the plurality of slot vectors may be configured to represent a corresponding entity contained in the perceptual representation. The operations additionally include determining an attention matrix based on a product of (i) the plurality of feature vectors transformed by a key function and (ii) the plurality of slot vectors transformed by a query function. Each respective value of a plurality of values along each respective dimension of a plurality of dimensions of the attention matrix may be normalized with respect to the plurality of values along the respective dimension. The operations further include determining an update matrix based on (i) the plurality of feature vectors transformed by a value function and (ii) the attention matrix. The operations yet further include updating the plurality of slot vectors based on the update matrix by way of the neural network memory unit.

In a fourth example embodiment, a system is provided that includes means for receiving a perceptual representation that includes a plurality of feature vectors. The system also includes means for initializing a plurality of slot vectors represented by a neural network memory unit. Each respective slot vector of the plurality of slot vectors may be configured to represent a corresponding entity contained in the perceptual representation. The system additionally includes means for determining an attention matrix based on a product of (i) the plurality of feature vectors transformed by a key function and (ii) the plurality of slot vectors transformed by a query function. Each respective value of a plurality of values along each respective dimension of a plurality of dimensions of the attention matrix may be normalized with respect to the plurality of values along the respective dimension. The system further includes means for determining an update matrix based on (i) the plurality of feature vectors transformed by a value function and (ii) the attention matrix. The system yet further includes means for updating the plurality of slot vectors based on the update matrix by way of the neural network memory unit.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 illustrates a flow chart, in accordance with example embodiments.

DETAILED DESCRIPTION

Figure 1:
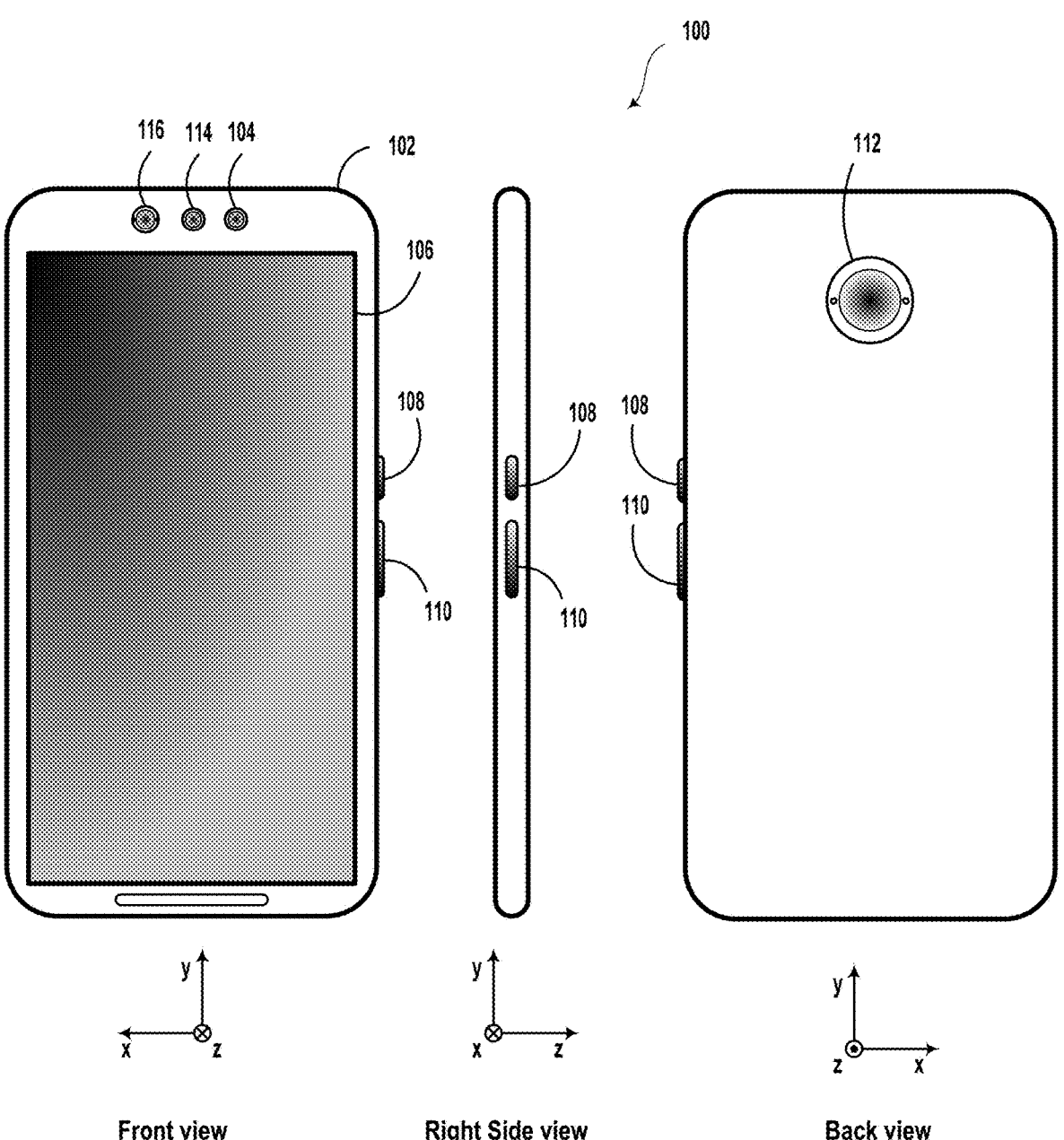
FIG. 1 illustrates a computing system, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

A slot attention module may be configured to determine entity-centric (e.g., object-centric) representations of entities contained in a perceptual representation on the basis of a distributed representation of the perceptual representation. An example perceptual representation may take the form of an image that contains therein one or more entities such as objects, surfaces, regions, backgrounds, or other environmental features. Machine learning models may be configured to generate the distributed representation of the image. For example, one or more convolutional neural networks may be configured to process the image and generate one or more convolutional feature maps, which may represent the output of various feature filters implemented by the one or more convolutional neural networks.

These convolutional feature maps may be considered a distributed representation of the entities in the image because the features represented by the feature maps are related to different portions along the image area, but are not directly/explicitly associated with any of the entities represented in the image data. On the other hand, an object-centric representation may associate one or more features with individual entities represented in the image data. Thus, for example, each feature in a distributed representation may be associated with a corresponding portion of the perceptual representation, while each feature in an entity-centric representation may be associated with a corresponding entity contained in the perceptual representation.

Accordingly, the slot attention module may be configured to generate a plurality of entity-centric representations, referred to herein as slot vectors, based on a plurality of distributed representations, referred to herein as feature vectors. Each slot vector may be an entity-specific semantic embedding that represents the attributes or properties of one or more corresponding entities. The slot attention module may thus be considered to be an interface between perceptual representations and a structured set of variables represented by the slot vectors.

The slot attention module may include a neural network memory unit, such as a gated recurrent unit (GRU) or a long-short term memory (LSTM) neural network, configured to store and update the plurality of slot vectors across iterations of processing the feature vectors by the slot attention module. Parameters of the neural network memory unit may be learned during training of the slot attention module. The plurality of slot vectors may be initialized with values prior to a first iteration of processing by the slot attention module. In one example, the plurality of slot vectors may be initialized with random values selected, for example, from a normal distribution. In other implementations, the plurality of slot vectors may be initialized with values that cause one or more of the slot vectors to bind to and/or attach to particular entities (e.g., based on the values of previously-determined slot vectors). Thus, a particular slot vector may be caused to represent the same entity across successive perceptual representations (e.g., successive video frames or successive sections of audio waveforms) by initializing the particular slot vector with values of the particular slot vector previously determined with respect to one or more preceding perceptual representations.

The slot attention module may also include learned value, key, and query functions. The slot attention module may be configured to calculate an attention matrix based on a dot product of (i) the plurality of feature vectors transformed by the key function and (ii) the plurality of slot vectors transformed by the query function. Entries of the attention matrix may be normalized by way of a softmax function along a dimension corresponding to the slot vectors, thus causing the slot vectors to compete with one another for representing the entities contained in the perceptual representation. For example, when the number of slot vectors corresponds to a number of columns of the attention matrix, each value within each respective row of the attention matrix may be normalized with respect to values within the respective row by way of the softmax function. On the other hand, when the number of slot vectors corresponds to a number of rows of the attention matrix, each value within each respective column of the attention matrix may be normalized with respect to values within the respective column by way of the softmax function.

The slot attention module may also be configured to calculate an update matrix based on (i) the attention matrix and (ii) the plurality of feature vectors transformed by the value function. The neural network memory unit may be configured to update the plurality of slot vectors based on the update matrix and previous values of the slot vectors, thereby allowing the values of the slot vectors to be refined to improve their representational accuracy over one or more iterations of the slot attention module.

The slot vectors generated by the slot attention module may be permutation invariant with respect to the feature vectors and permutation equivariant with respect to one another. Thus, for a given initialization of the slot vectors, the order of the feature vectors of a given perceptual representation might not influence the values of the slot vectors and/or the order of the values of the slot vectors. Different initializations of the slot vectors may, for a given perceptual representation, change the order of the slot vectors, while the set of values of the slot vectors remains approximately constant. Thus, permuting the order of the slot vectors after initialization thereof may be equivalent to permuting the output of the slot attention module. The permutation equivariance of the slot vectors with respect to one another allows the slot vectors to be fully interchangeable and allows each slot vector to represent various entities independently of their types, classifications, and/or semantics.

The plurality of slot vectors may be used by one or more machine learning models to perform specific tasks, such as image reconstruction, text translation, object attribute/property detection, reward prediction, visual reasoning, question answering, control, and/or planning, among other possible tasks. Thus, the slot attention module may be trained jointly with the one or more machine learning models to generate slot vectors that are useful in carrying out the particular task of the one or more machine learning models. That is, the slot attention module may be trained to generate the slot vectors in a task-specific manner, such that the slot vectors represent the information important for the particular task and omit information that is not important and/or irrelevant for the particular task.

Although the slot attention module may be trained for a specific task, the architecture of the slot attention module is not task-specific and thus allows the slot attention module to be used for various tasks. The slot attention module may be used for both supervised and unsupervised training tasks. Additionally, the slot attention module does not assume, expect, or depend on the feature vectors representing a particular type of data (e.g., image data, waveform data, text data, etc). Thus, the slot attention module may be used with any type of data that can be represented by one or more feature vectors, and the type of data may be based on the task for which the slot attention module is used.

Further, the slot vectors themselves might not be specialized with respect to particular entity types and/or classifications. Thus, when multiple classes of entities are contained within the perceptual representation, each slot vector may be capable of representing each of the entities, regardless of its class. Each of the slot vectors may bind to or attach to a particular entity in order to represent its features, but this binding/attending is not dependent on entity type, classification, and/or semantics. The binding/attending of a slot vector to an entity may be driven by the downstream task for which the slot vectors are used—the slot attention module might not be "aware" of objects per-se, and might not distinguish between, for example, clustering objects, colors, and/or spatial regions.

II. Example Computing Devices

FIG. 1 illustrates an example form factor of computing system 100. Computing system 100 may be, for example, a mobile phone, a tablet computer, or a wearable computing device. However, other embodiments are possible. Computing system 100 may include various elements, such as body 102, display 106, and buttons 108 and 110. Computing system 100 may further include front-facing camera 104, rear-facing camera 112, front-facing infrared camera 114, and infrared pattern projector 116.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing system 100 may include multiple cameras positioned on various sides of body 102. Front-facing camera 104 and rear-facing camera 112 may each be configured to capture images in the visible light spectrum.

Display 106 could represent a cathode ray tube (CRT) display, a light emitting diode (LED) display, a liquid crystal (LCD) display, a plasma display, an organic light emitting diode (OLED) display, or any other type of display known in the art. In some embodiments, display 106 may display a digital representation of the current image being captured by front-facing camera 104, rear-facing camera 112, and/or infrared camera 114, and/or an image that could be captured or was recently captured by one or more of these cameras. Thus, display 106 may serve as a viewfinder for the cameras. Display 106 may also support touchscreen functions that may be able to adjust the settings and/or configuration of any aspect of computing system 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 and/or infrared camera 114 may be similarly or differently arranged. Additionally, one or more of front-facing camera 104, rear-facing camera 112, or infrared camera 114, may be an array of one or more cameras.

Either or both of front-facing camera 104 and rear-facing camera 112 may include or be associated with an illumination component that provides a light field in the visible light spectrum to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Infrared pattern projector 116 may be configured to project an infrared structured light pattern onto the target object. In one example, infrared projector 116 may be configured to project a dot pattern and/or a flood pattern. Thus, infrared projector 116 may be used in combination with infrared camera 114 to determine a plurality of depth values corresponding to different physical features of the target object.

Namely, infrared projector 116 may project a known and/or predetermined dot pattern onto the target object, and infrared camera 114 may capture an infrared image of the target object that includes the projected dot pattern. Computing system 100 may then determine a correspondence between a region in the captured infrared image and a particular part of the projected dot pattern. Given a position of infrared projector 116, a position of infrared camera 114, and the location of the region corresponding to the particular part of the projected dot pattern within the captured infrared image, computing system 100 may then use triangulation to estimate a depth to a surface of the target object. By repeating this for different regions corresponding to different parts of the projected dot pattern, computing system 100 may estimate the depth of various physical features or portions of the target object. In this way, computing system 100 may be used to generate a three-dimensional (3D) model of the target object.

Computing system 100 may also include an ambient light sensor that may continuously or from time to time determine the ambient brightness of a scene (e.g., in terms of visible and/or infrared light) that cameras 104, 112, and/or 114 can capture. In some implementations, the ambient light sensor can be used to adjust the display brightness of display 106. Additionally, the ambient light sensor may be used to determine an exposure length of one or more of cameras 104, 112, or 114, or to help in this determination.

Computing system 100 could be configured to use display 106 and front-facing camera 104, rear-facing camera 112, and/or front-facing infrared camera 114 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

As noted above, the functions of computing system 100 may be integrated into a computing device, such as a wireless computing device, cell phone, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a computer (such as a desktop, notebook, tablet, or handheld computer), personal digital assistant (PDA), a home automation component, a digital video recorder (DVR), a digital television, a remote control, a wearable computing device, a gaming console, a robotic device, or some other type of device. Computing device 200 may be equipped with at least some image capture and/or image processing capabilities, and/or audio capture and/or audio processing capabilities. It should be understood that computing device 200 may represent a physical image and/or audio processing system, a particular physical hardware platform on which an image and/or audio sensing and processing application operates in software, or other combinations of hardware and software that are configured to carry out image capture and/or processing functions and/or audio capture and/or processing functions.

Figure 2:
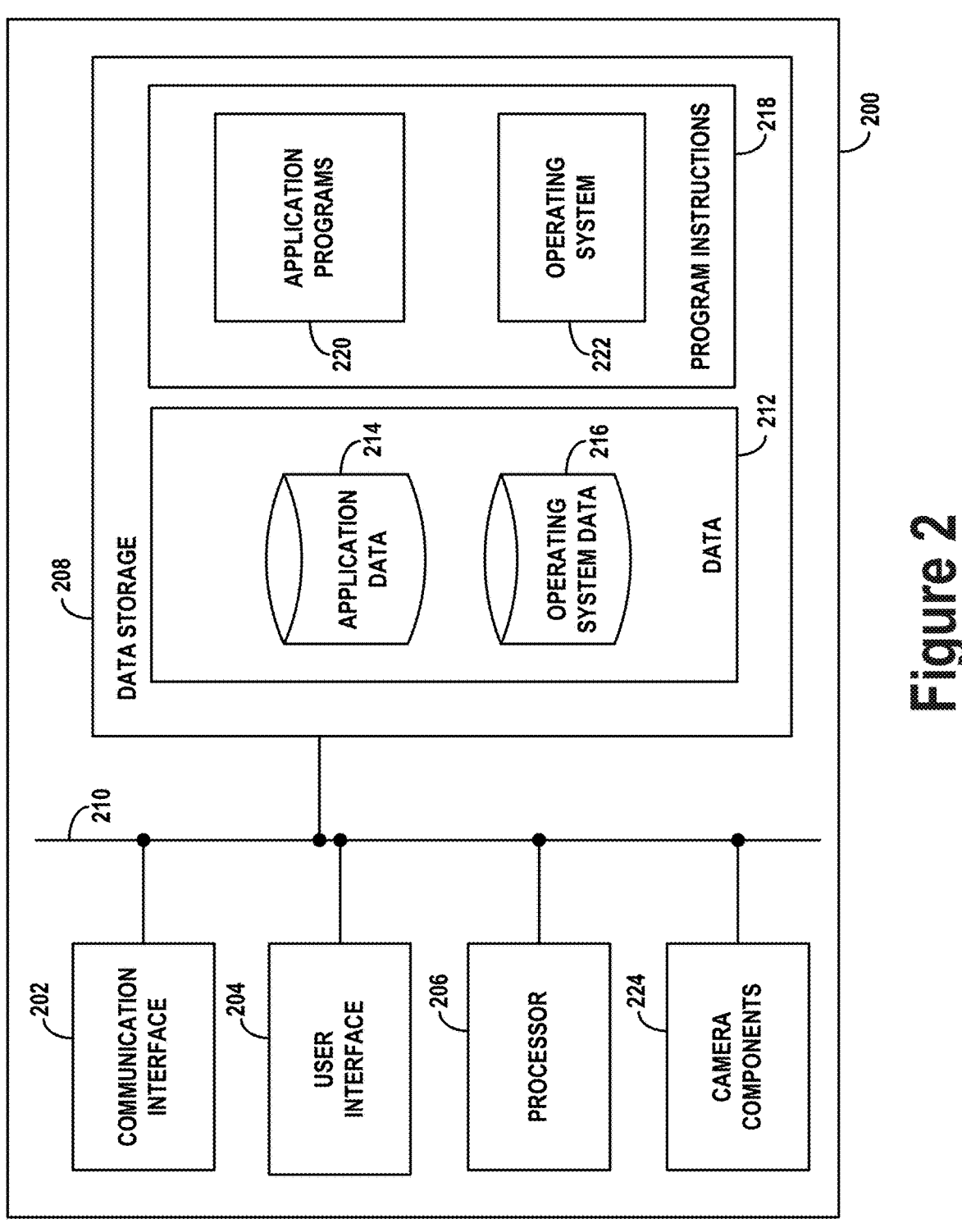
FIG. 2 illustrates a computing device, in accordance with example embodiments.

As shown in FIG. 2, computing device 200 may include communication interface 202, user interface 204, processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some embodiments, user interface 204 may include a display that serves as a viewfinder for still camera and/or video camera functions supported by computing device 200 (e.g., in both the visible and infrared spectrum). Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 400-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. Example Slot Attention Module

Figure 3:
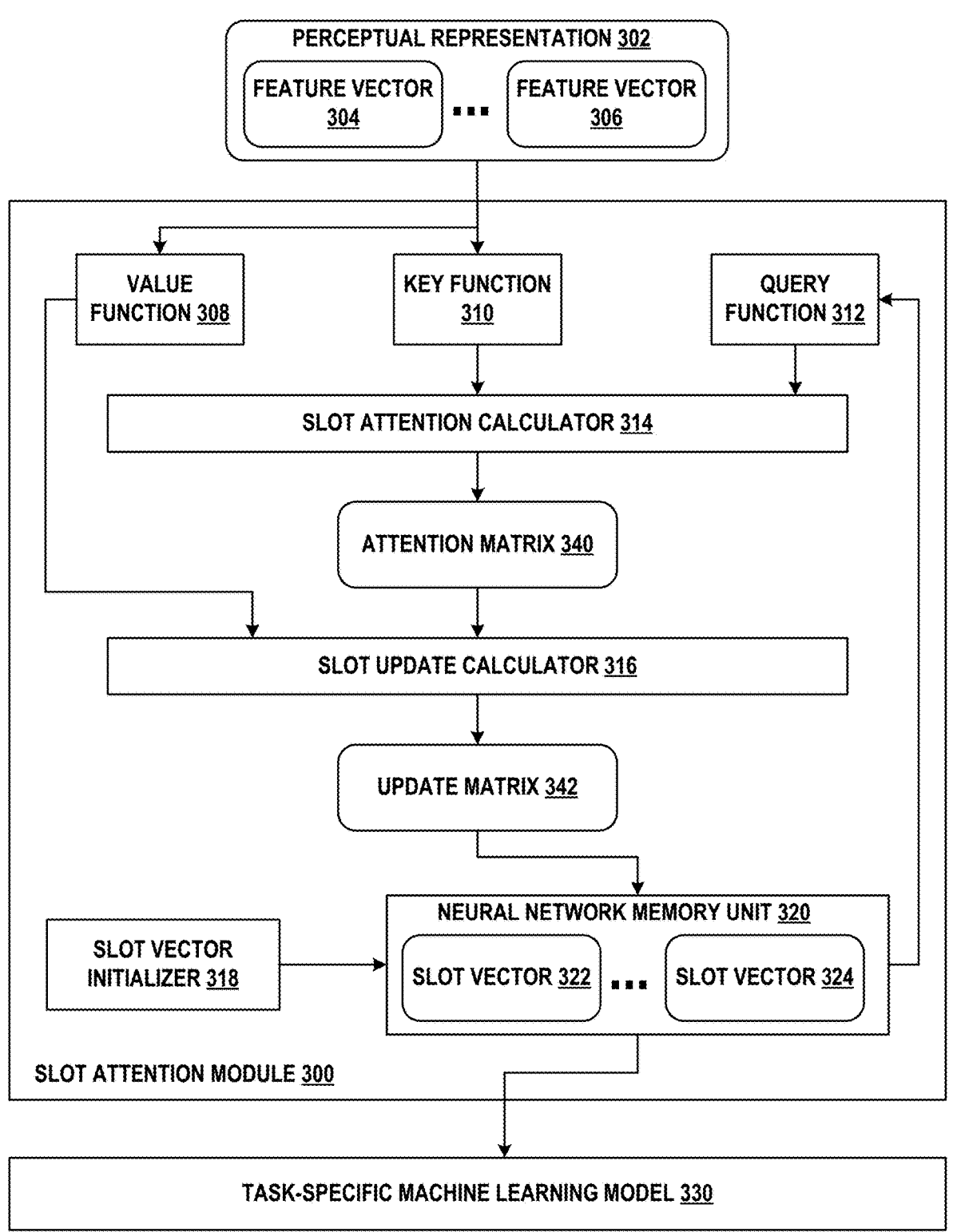
FIG. 3 illustrates a slot attention module, in accordance with example embodiments.

FIG. 3 illustrates a block diagram of slot attention module 300. Slot attention module 300 may include value function 308, key function 310, query function 312, slot attention calculator 314, slot update calculator 316, slot vector initializer 318, and neural network memory unit 320. Slot attention module 300 may be configured to receive as input perceptual representation 302, which may include feature vectors 304-306. Slot attention module 300 may be configured to generate slot vectors 322-324 based on perceptual representation 302. Feature vectors 304-306 may represent a distributed representation of the entities in perceptual representation 302, while slot vectors 322-324 may represent an entity-centric representation of these entities. Slot attention module 300 and the components thereof may represent a combination of hardware and/or software components configured to implement the functions described herein.

Perceptual representation 302 may represent various types of data, including, for example, two-dimensional image data (e.g., red-green-blue image data or grayscale image data), depth image data, point cloud data, audio data, time series data, or text data, among other possibilities. In some cases, perceptual representation 302 may be captured and/or generated by one or more sensors, such as visible light cameras (e.g., camera 104), near-infrared cameras (e.g., infrared camera 114), thermal cameras, stereoscopic cameras, time-of-flight (ToF) cameras, light detection and ranging (LIDAR) devices, radio detection and ranging (RADAR) devices, and/or microphones, among other possibilities. In other cases, perceptual representation 302 may additionally or alternatively include data generated by one or more users (e.g., words, sentences, paragraphs, and/or documents) or computing devices (e.g., rendered three-dimensional environments, time series plots), among other possibilities.

Perceptual representation 302 may be processed by way of one or more machine learning models to generate feature vectors 304-306. Each feature vector of feature vectors 304-306 may include a plurality of values, with each value corresponding to a particular dimension of the feature vector. In some implementations, the plurality of values of each feature vector may collectively represent an embedding of at least a portion of perceptual representation 302 in a vector space defined by the one or more machine learning models. When perceptual representation 302 is an image, for example, each of feature vectors 304-306 may be associated with one or more pixels in the image, and may represent the various features of the one or more pixels. In some cases, the one or more machine learning models used to process perceptual representation 302 may include convolutional neural networks. Accordingly, feature vectors 304-306 may represent a map of convolutional features of perceptual representation 302, and may thus include the outputs of various convolutional filters.

Each respective feature vector of feature vectors 304-306 may include a position embedding that indicates a portion of perceptual representation 302 represented by the respective feature vector. Feature vectors 304-306 may be determined, for example, by adding the position embedding to the convolutional features extracted from perceptual representation 302. Encoding the position associated with each respective feature vector of feature vectors 304-306 as part of the respective feature vector, rather than by way of the order in which the respective feature vector is provided to slot attention module 300, allows feature vectors 304-306 to be provided to slot attention module 300 in a plurality of different orders. Thus, including the position embeddings as part of feature vectors 304-306 enables slot vectors 322-324 generated by slot attention module 300 to be permutation invariant with respect to feature vectors 304-306.

In the case of an image, for example, the position embedding may be generated by constructing a W×H×4 tensor, where W and H represent the width and height, respectively, of the map of the convolutional features of perceptual representation 302. Each of the four values associated with each respective pixel along the W×H map may represent a position of the respective pixel relative to a border, boundary, and/or edge of the image along a corresponding direction (i.e., up, down, right, and left) of the image. In some cases, each of the four values may be normalized to a range from 0 to 1, inclusive. The W×H×4 tensor may be projected to the same dimension as the convolutional features (i.e., the same dimension as feature vectors 304-306) by way of a learnable linear map. The projected W×H×4 tensor may then be added to the convolutional features to generate feature vectors 304-306, thereby embedding feature vectors 304-

306 with positional information. In some implementations, the sum of the projected W×H×4 tensor and the convolutional features may be processed by one or more machine learning models (e.g., one or more multi-layer perceptrons) to generate feature vectors 304-306. Similar position embeddings may be included in feature vectors 304-306 for other types of perceptual representations as well.

Feature vectors 304-306 may be provided as input to key function 310. Feature vectors 304-306 may include N vectors each having I dimensions. Thus, in some implementations, feature vectors 304-306 may be represented by an input matrix X having N rows (each corresponding to a particular feature vector) and I columns.

In some implementations, key function 310 may include a linear transformation represented by a key weight matrix $W_{KEY}$ having I rows and D columns. In other implementations, key function 310 may include a multi-layer perceptron that includes one or more hidden layers and that utilizes one or more non-linear activation functions. Key function 310 (e.g., key weight matrix $W_{KEY}$) may be learned during training of slot attention module 300. The input matrix X may be transformed by key function 310 to generate a key input matrix $X_{KEY}$ (e.g., $X_{KEY}=XW_{KEY}$), which may be provided as input to slot attention calculator 314. Key input matrix $X_{KEY}$ may include N rows and D columns.

Feature vectors 304-306 may also be provided as input to value function 308. In some implementations, value function 308 may include a linear transformation represented by a value weight matrix $W_{VALUE}$ having I rows and D columns. In other implementations, value function 308 may include a multi-layer perceptron that includes one or more hidden layers and that utilizes one or more non-linear activation functions. Value function 308 (e.g., value weight matrix $W_{VALUE}$) may be learned during training of slot attention module 300. The input matrix X may be transformed by value function 308 to generate a value input matrix $X_{VALUE}$ (e.g., $X_{VALUE}=XW_{VALUE}$), which may be provided as input to slot update calculator 316. Value input matrix $X_{VALUE}$ may include N rows and D columns.

Since the dimensions of key weight matrix $W_{KEY}$ and the value weight matrix $W_{VALUE}$ do not depend on the number N of feature vectors 304-306, different values of N may be used during training and during testing/usage of slot attention module 300. For example, slot attention module 300 may be trained on perceptual inputs with N=1024 feature vectors, but may be used with N=512 feature vectors or N=2048 feature vectors. However, since at least one dimension of the key weight matrix $W_{KEY}$ and the value weight matrix $W_{VALUE}$ does depend on the dimension I of feature vectors 304-306, the same value of I may be used during training and during testing/usage of slot attention module 300.

Slot vector initializer 318 may be configured to initialize each of slot vectors 322-324 stored by neural network memory unit 320. In one example, slot vector initializer 318 may be configured to initialize each of slot vectors 322-324 with random values selected, for example, from a normal (i.e., Gaussian) distribution. In other examples, slot vector initializer 318 may be configured to initialize one or more respective slot vectors of slot vectors 322-324 with "seed" values configured to cause the one or more respective slot vectors to attend/bind to, and thereby represent, a particular entity contained within perceptual representation 302. For example, when processing image frames of a video, slot vector initializer 318 may be configured to initialize slot vectors 322-324 for a second image frame based on the values of the slot vectors 322-324 determined with respect to a first image frame that precedes the second image frame. Accordingly, a particular slot vector of slot vectors 322-324 may be caused to represent the same entity across image frames of the video. Other types of sequential data may be similarly "seeded" by slot vector initializer 318.

Slot vectors 322-324 may include K vectors each having S dimensions. Thus, in some implementations, slot vectors 322-324 may be represented by an output matrix Y having K rows (each corresponding to a particular slot vector) and S columns.

In some implementations, query function 312 may include a linear transformation represented by a query weight matrix $W_{QUERY}$ having S rows and D columns. In other implementations, query function 312 may include a multi-layer perceptron that includes one or more hidden layers and that utilizes one or more non-linear activation functions. Query function 312 (e.g., query weight matrix $W_{QUERY}$) may be learned during training of slot attention module 300. The output matrix Y may be transformed by query function 312 to generate a query input matrix $Y_{QUERY}$ (e.g., $Y_{QUERY}=YW_{QUERY}$), which may be provided as input to slot attention calculator 314. Query output matrix $Y_{QUERY}$ may include K rows and D columns. Thus, the dimension D may be shared by value function 308, key function 310, and query function 312.

Further, since the dimensions of the query weight matrix $W_{QUERY}$ do not depend on the number K of slot vectors 322-324, different values of K may be used during training and during testing/usage of slot attention module 300. For example, slot attention module 300 may be trained with K=7 slot vectors, but may be used with K=5 slot vectors or K=11 slot vectors. Thus, slot attention module 300 may be configured to generalize across different numbers of slot vectors 322-324 without explicit training, although training and using slot attention module 300 with the same number of slot vectors 322-324 may improve performance. However, since at least one dimension of the query weight matrix $W_{QUERY}$ does depend on the dimension S of slot vectors 322-324, the same value of S may be used during training and during testing/usage of slot attention module 300.

Slot attention calculator 314 may be configured to determine attention matrix 340 based on key input matrix $X_{KEY}$ generated by key function 310 and query input matrix $Y_{QUERY}$ generated by query function 312. Specifically, slot attention calculator 314 may be configured to calculate a dot product between key input matrix $X_{KEY}$ and a transpose of query output matrix $Y_{QUERY}$. In some implementations, slot attention calculator 314 may also divide the dot product by the square root of D (i.e., the number of columns of the $W_{VALUE}$, $W_{KEY}$, and/or $W_{QUERY}$ matrices). Thus, slot attention calculator 314 may implement the function $M=(1/\sqrt{D})X_{KEY}(Y_{QUERY})^T$, where M represents a non-normalized version of attention matrix 340 and may include N rows and K columns.

Slot attention calculator 314 may be configured to determine attention matrix 340 by normalizing the values of the matrix M with respect to the output axis (i.e., with respect to slot vectors 322-324). Thus, the values of the matrix M may be normalized along the rows thereof (i.e., along the dimension K corresponding to the number of slot vectors 322-324). Accordingly, each value in each respective row may be normalized with respect to the K values contained in the respective row.

Thus, slot attention calculator 314 may be configured to determine attention matrix 340 by normalizing each respective value of a plurality of values of each respective row of the matrix M with respect to the plurality of values of the respective row. Specifically, slot attention calculator 314 may determine attention matrix 340 according to $$A_{i,j} = \left(e^{M_{i,j}}\right)/\left(\sum_{l=1}^{K} e^{M_{i,l}}\right),$$
5 where $A_{i,j}$ indicates the value at a position corresponding to row i and column j of attention matrix 340, which may be alternatively referred to as attention matrix A. Normalizing the matrix M in this manner may cause slots to compete with one another for representing a particular entity. The function implemented by slot attention calculator 314 for computing $A_{i,j}$ may be referred to as a softmax function. Attention matrix A (i.e., attention matrix 340) may include N rows and K columns.

In other implementations, the matrix M may be transposed prior to normalization, and the values of the matrix $M^T$ may thus be normalized along the columns thereof (i.e., along the dimension K corresponding to the number of slot vectors 322-324). Accordingly, each value in each respective column of the matrix $M^T$ may be normalized with respect to the K values contained in the respective column. Slot attention calculator 314 may determine a transposed version of attention matrix 340 according to $$A_{i,j}^{T} = \left(e^{M_{i,j}}\right)/\left(\sum_{l=1}^{K} e^{M_{l,j}}\right),$$

where $$A_{i,j}^{T}$$

indicates the value at a position corresponding to row i and column j of transposed attention matrix 340, which may be alternatively referred to as transposed attention matrix $A^T$. Nevertheless, transposed attention matrix 340 may still be determined by normalizing the values of the matrix M with respect to the output axis (i.e., with respect to slot vectors 322-324).

Slot update calculator 316 may be configured to determine update matrix 342 based on value input matrix $X_{VALUE}$ generated by value function 308 and attention matrix 340. In one implementation, slot update calculator 316 may be configured to determine update matrix 342 by determining a dot product of a transpose of the attention matrix A and the value input matrix $X_{VALUE}$. Thus, slot update calculator 316 may implement the function $U_{WEIGHTED\ SUM} = A^T X_{VALUE}$, where the attention matrix A may be viewed as specifying the weights of a weighted sum calculation and the value input matrix $X_{VALUE}$ may be viewed as specifying the values of the weighted sum calculation. Update matrix 342 may thus be represented by $U_{WEIGHTED\ SUM}$, which may include K rows and D columns.

In another implementation, slot update calculator 316 may be configured to determine update matrix 342 by determining a dot product of a transpose of an attention weight matrix $W^{ATTENTION}$ and the value input matrix $X_{VALUE}$. Elements/entries of the attention weight matrix $W^{ATTENTION}$ may be defined as $$W_{i,j}^{ATTENTION} = (A_{i,j})/\left(\sum_{l=1}^{N} A_{l,j}\right),$$
65 or, for the transpose thereof, as $$\left(W_{i,j}^{ATTENTION}\right)^{T} = \left(A_{i,j}^{T}\right)/\left(\sum_{l=1}^{N} A_{i,l}^{T}\right).$$

Thus, slot update calculator 316 may implement the function $U_{WEIGHTED\ MEAN} = (W^{ATTENTION})^T X_{VALUE}$, where the matrix A may be viewed as specifying the weights of a weighted mean calculation and the value input matrix $X_{VALUE}$ may be viewed as specifying the values of the weighted mean calculation. Update matrix 342 may thus be represented by $U_{WEIGHTED\ MEAN}$, which may include K rows and D columns.

Update matrix 342 may be provided as input to neural network memory unit 320, which may be configured to update slot vectors 322-324 based on the previous values of slot vectors 322-324 and update matrix 342. Neural network memory unit 320 may include a gated recurrent unit (GRU) and/or a long-short term memory (LSTM) network, as well as other neural network or machine learning-based memory units configured to store and/or update slot vectors 322-324. For example, in addition to a GRU and/or an LSTM, neural network memory unit 320 may include one or more feed-forward neural network layers configured to further modify the values of slot vectors 322-324 after modification by the GRU and/or LSTM (and prior to being provided to task-specific machine learning model 330).

In some implementations, neural network memory unit 320 may be configured to update each of slot vectors 322-324 during each processing iteration, rather than updating only some of slot vectors 322-324 during each processing iteration. Training neural network memory unit 320 to update the values of slot vectors 322-324 based on the previous values thereof and based on update matrix 342, rather than using update matrix 342 as the updated values of slot vectors 322-324, may improve the accuracy and/or speed up convergence of slot vectors 322-324.

Slot attention module 300 may be configured to generate slot vectors 322-324 in an iterative manner. That is, slot vectors 322-324 may be updated one or more times before being passed on as input to task-specific machine learning model 330. For example, slot vectors 322-324 may be updated three times before being considered "ready" to be used by task-specific machine learning model 330. Specifically, the initial values of slot vectors 322-324 may be assigned thereto by slot vector initializer 318. When the initial values are random, they likely will not accurately represent the entities contained in perceptual representation 302. Thus, feature vectors 304-306 and the randomly-initialized slot vectors 322-324 may be processed by components of slot attention module 300 to refine the values of slot vectors 322-324, thereby generating updated slot vectors 322-324.

After this first iteration or pass through slot attention module 300, each of slot vectors 322-324 may begin to attend to and/or bind to, and thus represent, one or more corresponding entities contained in perceptual representation 302. Feature vectors 304-306 and the now-updated slot vectors 322-324 may again be processed by components of slot attention module 300 to further refine the values of slot vectors 322-324, thereby generating another update to slot vectors 322-324. After this second iteration or pass through slot attention module 300, each of slot vectors 322-324 may continue to attend to and/or bind to the one or more corresponding entities with increasing strength, thereby representing the one or more corresponding entities with increasing accuracy.

Further iterations may be performed, and each additional iteration may generate some improvement to the accuracy with which each of slot vectors 322-324 represents its corresponding one or more entities. After a predetermined number of iterations, slot vectors 322-324 may converge to an approximately stable set of values, resulting in no additional accuracy improvements. Thus, the number of iterations of slot attention module 300 may be selected based on (i) a desired level of representational accuracy for slot vectors 322-324 and (ii) desired processing time before slot vectors 322-324 are usable by task-specific machine learning model 330.

Task-specific machine learning model 330 may represent a plurality of different tasks, including both supervised and unsupervised learning tasks. Example implementations of task-specific machine learning model 330 are illustrated in and discussed with respect to FIGS. 5A and 5B. Task-specific machine learning model 330 may be co-trained with slot attention module 300. Thus, depending on the specific task associated with task-specific machine learning model 330, slot attention module 300 may be trained to generate slot vectors 322-324 that are adapted for and provide values useful in executing the specific task. Specifically, learned parameters associated with one or more of value function 308, key function 310, query function 312, and/or neural network memory unit 320 may vary as a result of training based on the specific task associated with task-specific machine learning model 330. In some implementations, slot attention module 300 may be trained using adversarial training and/or contrastive learning, among other training techniques.

Slot attention module 300 may take less time to train (e.g., 24 hours, compared to 7 days for an alternative approach executed on the same computing hardware) and consume fewer memory resources (e.g., allowing for a batch size of 64, compared to a batch size of 4 for the alternative approach executed on the same computing hardware) than alternative approaches for determining entity-centric representations. In some implementations, slot attention module 300 may also include one or more layer normalizations. For example, layer normalizations may be applied to feature vectors 304-306 prior to the transformation thereof by the key function 310, to slot vectors 322-324 prior to transformation thereof by query function 312, and/or to slot vectors 322-324 after being at least partially updated by neural network memory unit 320. Layer normalizations may improve the stability and speed up the convergence of slot attention module 300.

IV. Example Slot Vectors

Figure 4:
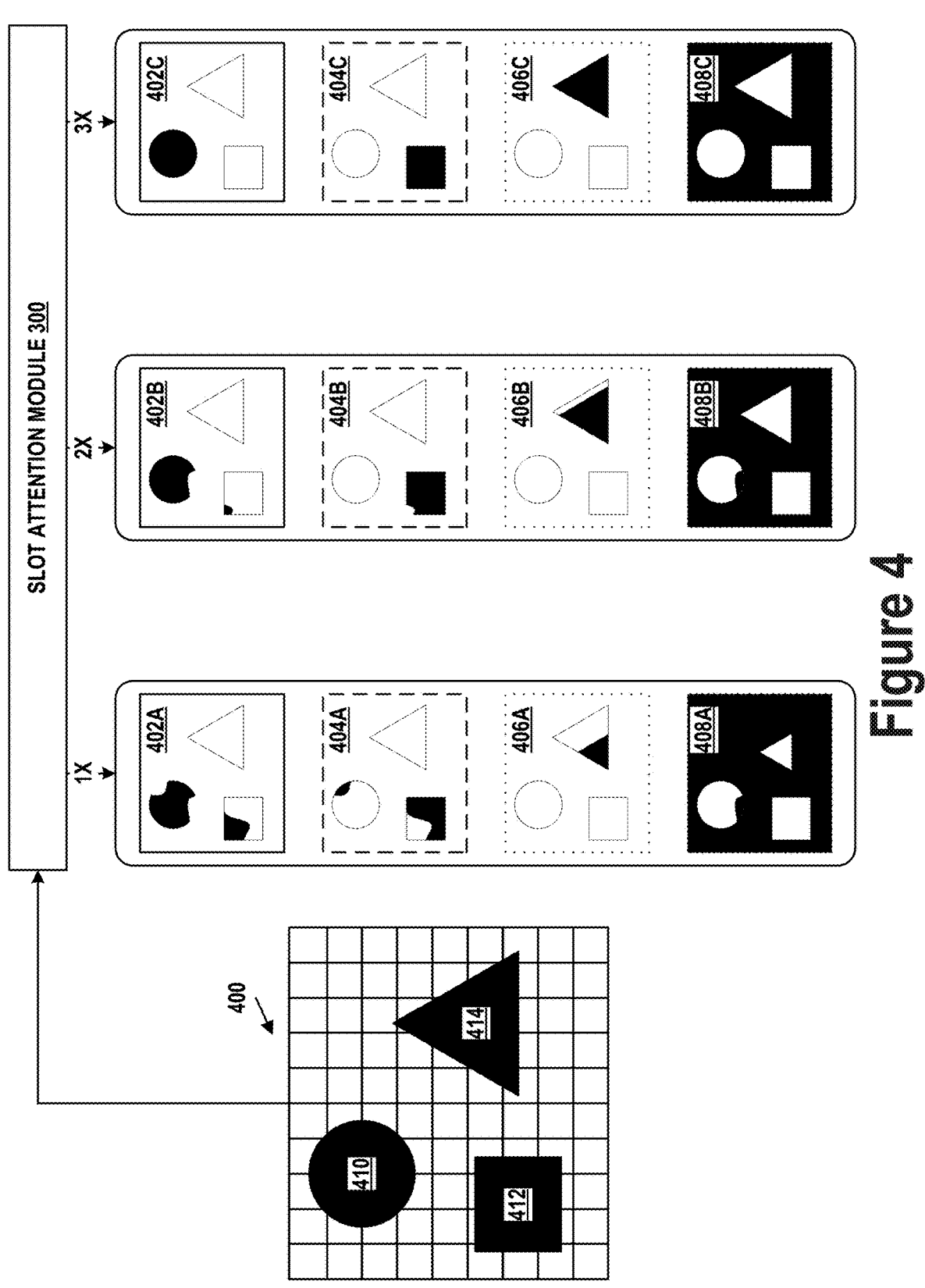
FIG. 4 illustrates slot vectors, in accordance with example embodiments.

FIG. 4 graphically illustrates an example of a plurality of slot vectors changing over the course of processing iterations by slot attention module 300 with respect to a particular perceptual representation. In this example, perceptual representation 302 is represented by image 400 that includes three entities: entity 410 (i.e., a circular object); entity 412 (i.e., a square object); and entity 414 (i.e., a triangular object). Image 400 may be processed by one or more machine learning models to generate feature vectors 304-306, each represented by a corresponding grid element of the grid overlaid on top of image 400. Thus, a leftmost grid element in the top row of the grid may represent feature vector 304, a rightmost grid element in the bottom row of the grid may represent feature vector 306, and grid elements therebetween may represent other feature vectors. Thus, each grid element may represent a plurality of vector values associated with the corresponding feature vector.

FIG. 4 illustrates the plurality of slot vectors as having four slot vectors. However, in general, the number of slot vectors may be modifiable. For example, the number of slot vectors may be selected to be at least equal to a number of entities expected to be present in perceptual representation 302 so that each entity may be represented by a corresponding slot vector. Thus, in the example illustrated in FIG. 4, the four slot vectors provided exceed the number of entities (i.e., the three entities 410, 412, and 414) contained in image 400. In cases where the number of entities exceeds the number of slot vectors, one or more slot vectors may represent two or more entities.

Slot attention module 300 may be configured to process the feature vectors associated with image 400 and the initial values of the four slot vectors (e.g., randomly initialized) to generate slot vectors with values 402A, 404A, 406A, and 408A. Slot vector values 402A, 404A, 406A, and 408A may represent the output of a first iteration (1×) of slot attention module 300. Slot attention module 300 may also be configured to process the feature vectors and slot vectors with values 402A, 404A, 406A, and 408A to generate slot vectors with values 402B, 404B, 406B, and 408B. Slot vector values 402B, 404B, 406B, and 408B may represent the output of a second iteration (2×) of slot attention module 300. Slot attention module 300 may be further configured to process the feature vectors and slot vectors with values 402B, 404B, 406B, and 408B to generate slot vectors with values 402C, 404C, 406C, and 408C. Slot vector values 402C, 404C, 406C, and 408C may represent the output of a third iteration (3×) of slot attention module 300. The visualizations of slot vector values 402A, 404A, 406A, 408A, 402B, 404B, 406B, 408B, 402C, 404C, 406C, 408C may represent visualizations of attention masks based on attention matrix 340 at each iteration and/or visualizations of reconstruction masks generated by task-specific machine learning model 330, among other possibilities.

The first slot vector (associated with values 402A, 402B, and 402C) may be configured to attend to and/or bind to entity 410, thereby representing attributes, properties, and/or characteristics of entity 410. Specifically, after the first iteration of slot attention module 300, the first slot vector may represent aspects of entity 410 and entity 412, as shown by the black-filled regions in the visualization of slot vector values 402A. After the second iteration of slot attention module 300, the first slot vector may represent a larger portion of entity 410 and a smaller portion of entity 412, as shown by the increased black-filled region of entity 410 and decreased black-filled region of entity 412 in the visualization of slot vector values 402B. After the third iteration of slot attention module 300, the first slot vector may represent entity 410 approximately exclusively, and might no longer represent entity 412, as shown by entity 410 being completely black-filled and entity 412 being illustrate completely white-filled in the visualization of slot vector values 402C. Thus, the first slot vector may converge and/or focus on representing entity 410 as slot attention module 300 updates and/or refines the values of the first slot vector. This attention and/or convergence of a slot vector to one or more entities is a result of the mathematical structure of components of slot attention module 300 and task-specific training of slot attention module 300.

The second slot vector (associated with values 404A, 404B, and 404C) may be configured to attend to and/or bind to entity 412, thereby representing attributes, properties, and/or characteristics of entity 412. Specifically, after the first iteration of slot attention module 300, the second slot vector may represent aspects of entity 412 and entity 410, as shown by the black-filled regions in the visualization of slot vector values 404A. After the second iteration of slot attention module 300, the second slot vector may represent a larger portion of entity 412 and might no longer represent entity 410, as shown by the increased black-filled region of entity 412 and entity 410 being illustrated completely white-filled in the visualization of slot vector values 404B. After the third iteration of slot attention module 300, the second slot vector may represent entity 412 approximately exclusively, and might continue to no longer represent entity 410, as shown by entity 412 being completely black-filled and entity 410 being completely white-filled in the visualization of slot vector values 404C. Thus, the second slot vector may converge and/or focus on representing entity 412 as slot attention module updates and/or refines the values of the second slot vector.

The third slot vector (associated with values 406A, 406B, and 406C) may be configured to attend to and/or bind to entity 414, thereby representing attributes, properties, and/or characteristics of entity 414. Specifically, after the first iteration of slot attention module 300, the third slot vector may represent aspects of entity 414, as shown by the black-filled regions in the visualization of slot vector values 406A. After the second iteration of slot attention module 300, the third slot vector may represent a larger portion of entity 414, as shown by the increased black-filled region of entity 414 in the visualization of slot vector values 404B. After the third iteration of slot attention module 300, the third slot vector may represent approximately the entirety of entity 414, as shown by entity 412 being completely black-filled in the visualization of slot vector values 406C. Thus, the third slot vector may converge and/or focus on representing entity 414 as slot attention module updates and/or refines the values of the third slot vector.

The fourth slot vector (associated with values 408A, 408B, and 408C) may be configured to attend to and/or bind to the background features of image 400, thereby representing attributes, properties, and/or characteristics of the background. Specifically, after the first iteration of slot attention module 300, the fourth slot vector may represent approximately the entirety of the background and respective portions of entities 410 and 414 that are not already represented by slot vector values 402A 404A, and/or 406A, as shown by the black-filled region in the visualization of slot vector values 408A. After the second iteration of slot attention module 300, the fourth slot vector may represent approximately the entirety of the background and smaller portions of entities 410 and 414 not already represented by slot vector values 402B 404B, and/or 406B, as shown by the black-filled region of the background and decreased black-filled region of entities 410 and 414 in the visualization of slot vector values 408B. After the third iteration of slot attention module 300, the fourth slot vector may approximately exclusively represent approximately the entirety of the background, as shown by the background being completely black-filled and entities 410, 412, and 414 being completely white-filled in the visualization of slot vector values 408C. Thus, the fourth slot vector may converge and/or focus on representing the background of image 400 as slot attention module updates and/or refines the values of the fourth slot vector.

In some implementations, rather than representing the background of image 400, the fourth slot vector may instead take on a predetermined value indicating that the fourth slot vector is not utilized to represent an entity. Thus, the background may be unrepresented. Alternatively or additionally, when additional slot vectors are provided (e.g., a fifth slot vector), the additional vectors may represent portions of the background or may be unutilized. Thus, in some cases, slot attention module 300 may distribute the representation of the background among multiple slot vectors. In some implementations, the slot vectors might treat the entities within the perceptual representation the same as the background thereof. Specifically, any one of the slot vectors may be used to represent the background and/or an entity (e.g., the background may be treated as another entity). Alternatively, in other implementations, one or more of the slot vectors may be reserved to represent the background.

The plurality of slot vectors may be invariant with respect to an order of the feature vectors and equivariant with respect to one another. That is, for a given initialization of the slot vectors, the order in which the feature vectors are provided at the input to slot attention module 300 does not affect the order and/or values of the slot vectors. However, different initializations of the slot vectors may affect the order of the slot vectors regardless of the order of the feature vectors. Further, for a given set of feature vectors, the set of values of the slot vectors may remain constant, but the order of the slot vectors may be different. Thus, different initializations of the slot vectors may affect the pairings between slot vectors and entities contained in the perceptual representation, but the entities may nevertheless be represented with approximately the same set of slot vector values.

V. Example Slot Attention Module Applications

Figure 5A:
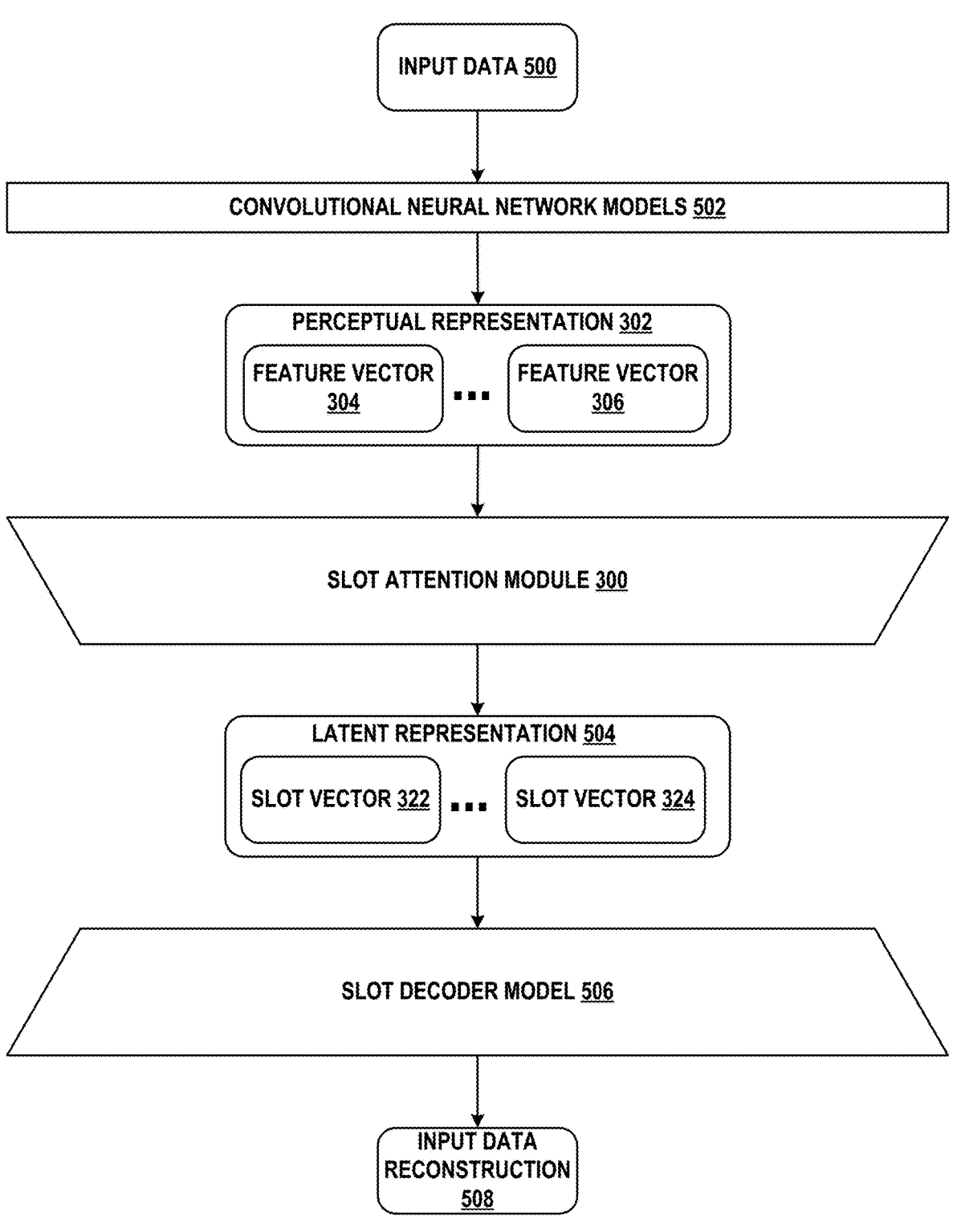
FIG. 5A illustrates an unsupervised learning application of the slot attention module, in accordance with example embodiments.

FIG. 5A illustrates an example application of slot attention module 300 to an unsupervised learning task. Specifically, convolutional neural network models 502 may be used to generate perceptual representation 302 based on input data 500, which may represent image data, time series (e.g., waveform) data, text data, point cloud data, and/or voxel data, among other types of input. Perceptual representation 302 may include feature vectors 304-306, which may represent results of processing of input data 500 by convolutional neural network models 502 and/or aspects of unprocessed input data 500. Perceptual representation 302 may be provided as input to slot attention module 300, which may be configured to generate slot vectors 322-324 based thereon.

Slot decoder model 506 may be configured to receive slot vectors 322-324 as input and, based thereon, generate input data reconstruction 508. The values of slot vectors 322-324 provided to slot decoder model 506 may represent the output of one or more iterations of processing by slot attention module 300. Slot attention module 300 and slot decoder model 506 may be trained jointly, thereby resulting in slot vectors 322-324 providing embeddings of entities present in input data 500 that can be used by slot decoder model 506 to reconstruct input data 500 (i.e., generate input data reconstruction 508). That is, co-training of slot attention module 300 and slot decoder model 506 allows slot decoder model 506 to "understand" the values of slot vectors 322-324.

In one example, input data 500 may represent image data, and slot decoder model 506 may individually decode each of slot vectors 322-324 using a spatial broadcast decoder. Specifically, each slot may be broadcast onto a two-dimensional grid which may be augmented with position embeddings. Each grid may be decoded using a convolutional neural network (the parameters of which may be shared across each of slot vectors 322-324) to generate an output of size W×H×4, where W and H represent the width and height, respectively, of the reconstructed slot-specific image data and the additional 4 dimensions represent the red, green, and blue color channels and a non-normalized alpha mask thereof. The alpha masks may be normalized across the slot-specific images using a softmax function and may be used as mixture weights to recombine and/or mix the slot-specific images into a final reconstruction of the original image data (i.e., input data reconstruction 508). In other examples, slot decoder model 506 may be and/or may include aspects of patch-based decoders.

Although slot attention module 300 may be used in combination with slot decoder model 506, the architecture of slot attention module 300 does not itself include or depend on any decoders and/or decoding operations. The functionality provided by a decoder in other attention-based neural network architectures is instead replaced by the iterative processing carried out by slot attention module— i.e., processing slot vectors 322-324 multiple times to achieve an accurate representation of entities in perceptual representation 302. Thus, slot attention module 300 may be used in applications beyond autoencoding, such as contrastive representation learning for object discovery and/or direct optimization of a downstream task, such as control planning.

Slot vectors 322-324 may collectively define latent representation 504 of input data 500. In some cases, latent representation 504 may represent a compression of the information contained in input data 500. Thus, in some implementations, slot attention module 300 may be used as and or viewed as a machine learning encoder. Accordingly, slot attention module 300 may be used for image reconstruction, text translation, and/or other applications that utilize machine learning encoders. Unlike certain other latent representations, each slot vector of latent representation 504 may capture the properties of corresponding one or more entities in perceptual representation 302, and may do so without relying on assumption about an order in which the entities are described by perceptual representation 302.

Further, reconstruction of input data 500 (i.e., generation of input data reconstruction 508) may be viewed as an unsupervised learning task at least because the training process may be carried out without assigning any explicit labels to input data 500. The accuracy of input data reconstruction 508 may be determined by comparing input data reconstruction 508 to input data 500, rather than to labels assigned to features in input data 500.

Figure 5B:
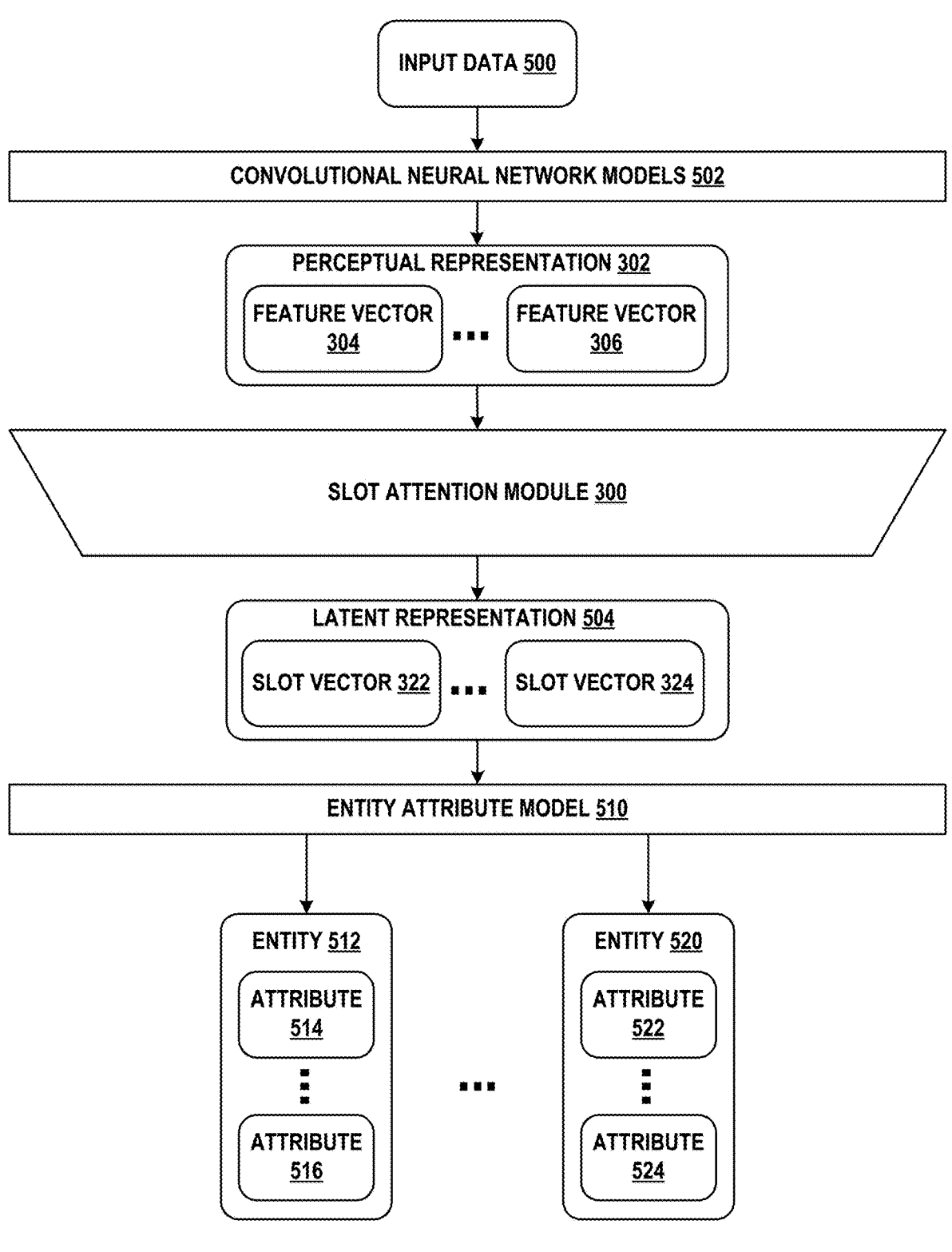
FIG. 5B illustrates a supervised learning application of the slot attention module, in accordance with example embodiments.

FIG. 5B illustrates an example application of slot attention module 300 to a supervised learning task. Specifically, convolutional neural network models 502 and slot attention module 300 may operate on input data 500 and perceptual representation 302, respectively, as discussed with respect to FIG. 5A, thereby generating slot vectors 322-324. Entity attribute model 510 may be configured to determine, based on slot vectors 322-324, a plurality of attributes of one or more entities represented in input data 500.

Specifically, entity attribute model 510 may be configured to generate attributes for entities 512-520. Thus, entity attribute model 510 may be configured to determine attributes 514-516 for entity 512 and entity attributes 522-524 for entity 520. When input data 500 represents an image, for example, entities 512-520 may represent various objects or environmental features depicted by the image, and attributes 514-516 and 522-524 may represent various properties of the corresponding objects and/or features. For example, attributes 514 and 522 may indicate a color of entities 512 and 520, respectively, while attributes 516 and 524 may indicate a shape of entities 512 and 520, respectively.

Entity attribute model 510 may represent a machine learning model, such as an artificial neural network having a plurality of layers. Entity attribute model 510 may be trained jointly with slot attention module 300, thereby resulting in slot vectors 322-324 providing embeddings of entities 512-520 present in input data 500 that can be used by entity attribute model 510 to determine the attributes of entities 512-520. That is, co-training of slot attention module 300 and entity attribute model 510 allows entity attribute model 510 to "understand" the values of slot vectors 322-324. Further, determination of the attributes of entities 512-520 may be viewed as a supervised learning task at least because the training process may utilize labels assigned to input data 500 to indicate the ground-truth values of the attributes of entities 512-520. The accuracy of the attributes of entities 512-520 determined by entity attribute model 510 may be determined by comparing these attributes to the ground-truth values.

Additionally, since slot attention module 300 is permutation equivariant with respect to slot vectors 322-324, training of this system may involve using a matching algorithm to match the individual outputs of entity attribute model 510 to corresponding ground-truth values. That is, different training iterations may result in a reordering of the pairing between slot vectors 322-324 and corresponding entities 512-520. As such reordering takes place, each of slot vectors 322-324 and corresponding entities 512-520 may be re-paired with the set of ground-truth data corresponding thereto using, for example, the Hungarian algorithm.

VI. Example Operations

FIG. 6 illustrates a flow chart of operations related to determining entity-centric representations of one or more entities contained in a perceptual representation. The operations may be carried out by computing system 100, computing device 200, and/or slot attention module 300, among other possible types of devices or device subsystems. The embodiments of FIG. 6 may be simplified by the removal of any one or more of the features shown therein. Further, these embodiments may be combined with features, aspects, and/or implementations of any of the previous figures or otherwise described herein.

Block 600 may involve receiving a perceptual representation comprising a plurality of feature vectors.

Block 602 may involve initializing a plurality of slot vectors represented by a neural network memory unit. Each respective slot vector of the plurality of slot vectors may be configured to represent a corresponding entity contained in the perceptual representation.

Block 604 may involve determining an attention matrix based on a product of (i) the plurality of feature vectors transformed by a key function and (ii) the plurality of slot vectors transformed by a query function. Each respective value of a plurality of values along each respective dimension of a plurality of dimensions of the attention matrix may be normalized with respect to the plurality of values along the respective dimension.

Block 606 may involve determining an update matrix based on (i) the plurality of feature vectors transformed by a value function and (ii) the attention matrix.

Block 608 may involve updating the plurality of slot vectors based on the update matrix by way of the neural network memory unit.

In some embodiments, a second attention matrix may be determined based on a product of (i) the plurality of feature vectors transformed by the key function and (ii) the plurality of updated slot vectors transformed by the query function. Each respective value of a plurality of values along each respective dimension of a plurality of dimensions of the second attention matrix may be normalized with respect to the plurality of values along the respective dimension of the second attention matrix. A second update matrix may be determined based on (i) the plurality of feature vectors transformed by the value function and (ii) the second attention matrix. The plurality of updated slot vectors may be further updated based on the second update matrix by way of the neural network memory unit.

In some embodiments, each respective slot vector may represent a semantic embedding of the corresponding entity.

In some embodiments, updating the respective slot vector may iteratively refine the representation of the corresponding entity and may bind the respective slot vector to the corresponding entity.

In some embodiments, the plurality of dimensions of the attention matrix may include a plurality of rows of the attention matrix. Each respective value of the plurality of values of each respective row of the plurality of rows of the attention matrix may be normalized with respect to the plurality of values of the respective row by way of a softmax function by dividing (i) an exponent of the respective value of the plurality of values of the respective row by (ii) a sum of exponents of the plurality of values of the respective row.

In some embodiments, normalizing each respective value of the plurality of values of each respective row of the plurality of rows of the attention matrix with respect to the plurality of values of the respective row by way of the softmax function may cause the plurality of slot vectors to compete with one another for representing entities contained in the perceptual representation.

In some embodiments, determining the update matrix may include determining a product of (i) the plurality of feature vectors transformed by the value function and (ii) a transpose of the attention matrix.

In some embodiments, determining the update matrix may include determining an attention weight matrix by dividing (i) each respective value of a plurality of values of each respective column of a plurality of columns of the attention matrix by (ii) a sum of the plurality of values in the respective column, and determining a product of (i) the plurality of feature vectors transformed by the value function and (ii) a transpose of the attention weight matrix.

In some embodiments, the plurality of slot vectors may include K slot vectors. Each respective dimension of the plurality of dimensions (e.g., each respective row of the plurality of rows of the attention matrix) may include K values. Each respective value of the K values along each respective dimension of the plurality of dimensions of the attention matrix may be normalized with respect to the K values along the respective dimension by way of a softmax function by dividing (i) an exponent of the respective value of the K values along the respective dimension by (ii) a sum of exponents of the K values along the respective dimension.

In some embodiments, normalizing each respective value of the K values along each respective dimension of the plurality of dimensions of the attention matrix with respect to the K values of the respective dimension by way of the softmax function may cause the plurality of slot vectors to compete with one another for representing entities contained in the perceptual representation.

In some embodiments, the plurality of feature vectors may include N feature vectors. The plurality of dimensions may be a first plurality of dimensions comprising N dimensions (e.g., N rows). Determining the update matrix may include: determining an attention weight matrix by dividing (i) each respective value of N values along each respective dimension of a second plurality of dimensions (e.g., columns) of the attention matrix by (ii) a sum of the N values along the respective dimension of the second plurality of dimensions, and determining a product of (i) the plurality of feature vectors transformed by the value function and (ii) a transpose of the attention weight matrix.

In some embodiments, one or more of: (i) the key function, (ii) the query function, (iii) the value function, or (iv) parameters of the neural network memory unit may be learned during training.

In some embodiments, the plurality of feature vectors may be represented by an input matrix that includes (i) N rows corresponding to a number of the plurality of feature vectors and (ii) I columns corresponding to a number of dimensions of each of the plurality of feature vectors. The key function may include a linear transformation represented by a key weight matrix comprising I rows and D columns.

In some embodiments, determining the attention matrix based on the product may include determining a dot product of (i) the plurality of feature vectors transformed by the key function and (ii) a transpose of the plurality of slot vectors transformed by the query function, and dividing the dot product by a square root of D.

In some embodiments, the plurality of slot vectors may be represented by a slot matrix that includes (i) K rows corresponding to a number of the plurality of slot vectors and (ii) S columns corresponding to a number of dimensions of each of the plurality of slot vectors. The query function may include a linear transformation represented by a query weight matrix comprising S rows and D columns.

In some embodiments, the plurality of feature vectors may be represented by an input matrix that includes (i) N rows corresponding to a number of the plurality of feature vectors and (ii) I columns corresponding to a number of dimensions of each of the plurality of feature vectors. The value function may include a linear transformation represented by a value weight matrix comprising I rows and D columns.

In some embodiments, the plurality of slot vectors may be permutation equivariant with respect to one another such that, for multiple different initializations of the plurality of slot vectors with respect to a given perceptual representation, a set of values of the plurality of slot vectors is approximately constant and an order of the plurality of slot vectors is variable.

In some embodiments, the plurality of slot vectors may be permutation invariant with respect to the plurality of feature vectors such that, for multiple different permutations of the plurality of feature vector, a set of values of the plurality of slot vectors is approximately constant.

In some embodiments, the respective slot vector may be configured to specialize in representing the corresponding entity contained in the perceptual representation independently of a classification of the corresponding entity.

In some embodiments, the perceptual representation may include one or more of: (i) two-dimensional image data, (ii) depth image data, (iii) point cloud data, (iv) time series data, (v) audio data, or (vi) text data. The perceptual representation may be processed by way of one or more machine learning models to generate the plurality of feature vectors.

In some embodiments, the one or more machine learning models may include a convolutional neural network.

In some embodiments, each respective feature vector of the plurality of feature vectors may include a position embedding that indicates a portion of the perceptual representation represented by the respective feature vector.

In some embodiments, the corresponding entity represented by the respective slot vector may include one or more of: (i) an object, (ii) a surface, (iii) a background, (iv) a waveform pattern, or (v) one or more words.

In some embodiments, the neural network memory unit may include at least one of: (i) a gated recurrent unit (GRU) or (ii) a long-short term memory neural network (LSTM).

In some embodiments, updating the plurality of slot vectors based on the update matrix by way of the neural network memory unit may include processing the update matrix by way of the neural network memory unit and updating the plurality of slot vectors by way of a feed-forward artificial neural network connected to an output of the neural network memory unit.

In some embodiments, a supervised learning task may be performed based on the updated plurality of slot vectors.

In some embodiments, the supervised learning task may be performed by one or more machine learning models that are jointly trained with one or more of the key function, the query function, the value function, or the neural network memory unit to perform the supervised learning task.

In some embodiments, the supervised learning task may include determining, by way of one or more machine learning models and based on the plurality of slot vectors, one or more attributes of entities represented by the perceptual representation.

In some embodiments, an unsupervised learning task may be performed based on the updated plurality of slot vectors.

In some embodiments, the unsupervised learning task may be performed by one or more machine learning models that are jointly trained with one or more of the key function, the query function, the value function, or the neural network memory unit to perform the unsupervised learning task.

In some embodiments, the unsupervised learning task may include determining, by way of one or more machine learning models and based on the plurality of slot vectors, a reconstruction of the perceptual representation.

In some embodiments, a layer normalization may be applied to one or more of: (i) the plurality of feature vectors prior to the transformation thereof by the key function, (ii) the plurality of slot vectors prior to transformation thereof by the query function, or (iii) the updated plurality of slot vectors after updating the plurality of slot vectors based on the update matrix.

In some embodiments, initializing the plurality of slot vectors may include initializing the plurality of slot vectors with values selected from a normal distribution.

In some embodiments, initializing the plurality of slot vectors may include initializing the plurality of slot vectors based on values of one or more preceding slot vectors determined for a preceding perceptual representation processed before the perceptual representation. Initializing the plurality of slot vectors based on the values of the one or more preceding slot vectors may cause the plurality of slot vectors to track entities across successive perceptual representations.

In some embodiments, the perceptual representation may include a first image frame of a video. Initializing the plurality of slot vectors may include initializing the plurality of slot vectors with values determined for the plurality of slot vectors based on a second image frame preceding the first image frame within the video to cause the plurality of slot vectors to track entities across image frames of the video.

In some embodiments, a number of slot vectors in the plurality of slot vectors may be adjustable.

In some embodiments, when a number of slot vectors in the plurality of slot vectors exceeds a number of entities contained in the perceptual representation, values of one or more slot vector of the plurality of slot vectors may be configured to indicate that the one or more slot vectors are unused. When the number of entities contained in the perceptual representation exceeds the number of slot vectors in the plurality of slot vectors, at least one slot vector of the plurality of slot vectors may be configured to represent multiple corresponding entities contained in the perceptual representation.

VII. Example Testing Results

Table 1 illustrates Adjusted Rand Index scores (in %, mean+/−standard deviation) comparing the performance of slot attention module 300 to other machine learning architectures, including IODINE, MONet, and Slot MLP, in an unsupervised object discovery task. Slot MLP represents a multi-layer perceptron model that, for performance testing purposes, replaces slot attention module 300 and instead maps the feature vectors to the slot vectors. CLEVR6, Multi-dSprites, and Tetrominoes represent multi-object data sets used as benchmarks in evaluating image processing models. As can be seen from Table 1, slot attention module 300 performs at least as well as the other machine learning architectures and, in most cases, outperforms the other machine learning architectures. Slot attention module 300 may similarly match or outperform the other machine learning architectures in performing tasks other than unsupervised object discovery.

TABLE 1

|  | CLEVR6 | Multi-dSprites | Tetrominoes |
|---|---|---|---|
| Slot Attention Module | 98.8 +/− 0.3 | 91.3 +/− 0.3 | 99.5 +/− 0.2 |
| IODINE | 98.8 +/− 0.0 | 76.7 +/− 5.6 | 99.2 +/− 0.4 |
| MONet | 96.2 +/− 0.6 | 90.4 +/− 0.8 |  |
| Slot MLP | 60.4 +/− 6.6 | 60.4 +/− 1.8 | 25.1 +/− 34.3 |

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method for generating entity-centric representations for performing downstream tasks, the method comprising:

providing, to a machine learning (ML) model executed by a processor, a plurality of feature vectors comprising N feature vectors that represent features of an input data;

initializing, by the processor, a plurality of slot vectors represented by a neural network memory unit of the ML model and comprising K slot vectors, wherein initializing the plurality of slot vectors comprises determining initial values for the plurality of slot vectors;

determining updated values of the plurality of slot vectors by executing, using the processor, a plurality of iterations of the ML model in which the ML model processes the plurality of feature vectors and the plurality of slot vectors, wherein the plurality of iterations cause each respective slot vector of the plurality of slot vectors to converge to representing a corresponding entity contained in the input data by replacing the initial values with the updated values during the plurality of iterations, and wherein each respective iteration of the plurality of iterations comprises:

determining, using a slot attention calculator of the ML model, an attention matrix based on a product of (i) the plurality of feature vectors transformed by a key function of the ML model and (ii) the plurality of slot vectors transformed by a query function of the ML model, wherein the attention matrix comprises N vectors corresponding to a first dimension of the attention matrix, wherein each respective vector of the N vectors comprises K values corresponding to a second dimension of the attention matrix, and wherein the slot attention calculator normalizes each respective value of the K values of each respective vector of the N vectors of the attention matrix with respect to the K values of the respective vector;

determining, using a slot update calculator of the ML model, an update matrix based on (i) the plurality of feature vectors transformed by a value function of the ML model and (ii) the attention matrix;

updating values of the plurality of slot vectors based on the update matrix and using the neural network memory unit of the ML model, wherein the neural network memory unit provides the updated values of the plurality of slot vectors as input to the query function for a subsequent iteration of the plurality of iterations;

determining, by the ML model executed by the processor, a task-specific output based on the updated values of the plurality of slot vectors; and performing, using the processor, a downstream task on one or more entities contained in the input data based on the task-specific output.

2. The computer-implemented method of claim 1, wherein a respective iteration of the plurality of iterations refines prior values of the respective slot vector towards convergence to representing the corresponding entity contained in the input data, and wherein the prior values of the respective slot vector are determined by a prior iteration that precedes the respective iteration.

3. The computer-implemented method of claim 1, wherein each respective slot vector represents a semantic embedding of the corresponding entity, wherein determining the updated values of the plurality of slot vectors (i) iteratively refines the semantic embedding of the corresponding entity and (ii) causes the respective slot vector to converge to representing the corresponding entity independently of a classification of the corresponding entity.

4. The computer-implemented method of claim 1, wherein normalizing by the slot attention calculator each respective value of the K values along each respective vector of the N vectors of the attention matrix with respect to the K values of the respective vector comprises using a softmax function to divide (i) an exponent of the respective value of the K values of the respective vector by (ii) a sum of exponents of the K values of the respective vector.

5. The computer-implemented method of claim 1, wherein normalizing by the slot attention calculator each respective value of the K values along each respective vector of the N vectors of the attention matrix with respect to the K values of the respective vector causes the plurality of slot vectors to compete with one another for representing entities contained in the input data by causing two or more slot vector of the plurality of slot vectors to attempt to represent a particular entity of the entities.

6. The computer-implemented method of claim 1, wherein determining the update matrix comprises:

determining a product of (i) the plurality of feature vectors transformed by the value function and (ii) a transpose of the attention matrix.

7. The computer-implemented method of claim 1, wherein determining the update matrix comprises:

determining an attention weight matrix by dividing (i) each respective value of N values of each respective vector of K vectors corresponding to the second dimension of the attention matrix by (ii) a sum of the N values of the respective vector of the K vectors; and determining a product of (i) the plurality of feature vectors transformed by the value function and (ii) a transpose of the attention weight matrix.

8. The computer-implemented method of claim 1, wherein the plurality of feature vectors are represented by an input matrix comprising: (i) N rows corresponding to a number of the plurality of feature vectors and (ii) I columns corresponding to a dimension of each of the plurality of feature vectors, wherein the plurality of slot vectors are represented by a slot matrix comprising: (i) K rows corresponding to a number of the plurality of slot vectors and (ii) S columns corresponding to a dimension of each of the plurality of slot vectors, wherein the key function comprises a linear transformation represented by a key weight matrix comprising I rows and D columns, wherein the query function comprises a linear transformation represented by a query weight matrix comprising S rows and D columns, wherein the value function comprises a linear transformation represented by a value weight matrix comprising I rows and D columns, and wherein one or more of the key weight matrix, the query weight matrix, or the value weight matrix are learned during training.

9. The computer-implemented method of claim 8, wherein determining the attention matrix based on the product comprises:

determining a dot product of (i) the plurality of feature vectors transformed by the key function and (ii) a transpose of the plurality of slot vectors transformed by the query function; and dividing the dot product by a square root of D.

10. The computer-implemented method of claim 1, wherein the plurality of slot vectors are permutation equivariant with respect to one another such that, for multiple different initializations of the plurality of slot vectors with respect to a given input data, a set of values of the plurality of slot vectors is approximately constant and an order of the plurality of slot vectors is variable, and wherein the plurality of slot vectors are permutation invariant with respect to the plurality of feature vectors such that, for multiple different permutations of the plurality of feature vector, the set of values of the plurality of slot vectors is approximately constant.

11. The computer-implemented method of claim 1, wherein the input data comprises one or more of: image data, depth image data, point cloud data, time series data, audio data, or text data, wherein the input data is processed by way of one or more machine learning models to generate the plurality of feature vectors, and wherein the corresponding entity represented by the respective slot vector comprises one or more of: an object, a surface, a background, a waveform pattern, or one or more words.

12. The computer-implemented method of claim 1, wherein each respective feature vector of the plurality of feature vectors comprises a position embedding that indicates a portion of the input data represented by the respective feature vector.

13. The computer-implemented method of claim 1, wherein the neural network memory unit comprises at least one of: (i) a gated recurrent unit (GRU) or (ii) a long-short term memory neural network (LSTM), and wherein one or more weights of the neural network memory unit are learned during training.

14. The computer-implemented method of claim 1, wherein updating the plurality of slot vectors based on the update matrix by way of the neural network memory unit comprises:

processing the update matrix by way of the neural network memory unit; and updating the plurality of slot vectors by way of a feed-forward artificial neural network connected to an output of the neural network memory unit.

15. The computer-implemented method of claim 1, wherein performing the downstream task comprises:

performing, by one or more machine learning models, at least one of a supervised learning task or an unsupervised learning task based on the task-specific output, wherein the one or more machine learning models are jointly trained with one or more components of the ML model to perform the at least one of the supervised learning task or the unsupervised learning task.

16. The computer-implemented method of claim 1, wherein initializing the plurality of slot vectors comprises:

determining the initial values of the plurality of slot vectors based on one or more of: (i) values selected from a normal distribution or (ii) values of one or more preceding slot vectors determined for a preceding input data processed before the input data, wherein initializing the plurality of slot vectors based on the values of the one or more preceding slot vectors causes the plurality of slot vectors to track entities across a sequence of input data.

17. The computer-implemented method of claim 1, wherein, when a number of slot vectors in the plurality of slot vectors exceeds a number of entities contained in the input data, values of one or more slot vector of the plurality of slot vectors are configured to indicate that the one or more slot vectors are unused, and wherein, when the number of entities contained in the input data exceeds the number of slot vectors in the plurality of slot vectors, at least one slot vector of the plurality of slot vectors is configured to represent multiple corresponding entities contained in the input data.

18. A system for generating entity-centric representations for performing downstream tasks, the system comprising:

a processor; and a non-transitory computer-readable storage medium having stored thereon instruction that, when executed by the processor, cause the processor to perform operations comprising:

providing, to a machine learning (ML) model executed by the processor, a plurality of feature vectors comprising N feature vectors that represent features of an input data;

initializing a plurality of slot vectors represented by a neural network memory unit of the ML model and comprising K slot vectors, wherein initializing the plurality of slot vectors comprises determining initial values for the plurality of slot vectors;

determining updated values of the plurality of slot vectors by executing a plurality of iterations of the ML model in which the ML model processes the plurality of feature vectors and the plurality of slot vectors, wherein the plurality of iterations cause each respective slot vector of the plurality of slot vectors to converge to representing a corresponding entity contained in the input data by replacing the initial values with the updated values during the plurality of iterations, and wherein each respective iteration of the plurality of iterations comprises:

determining, using a slot attention calculator of the ML model, an attention matrix based on a product of (i) the plurality of feature vectors transformed by a key function of the ML model and (ii) the plurality of slot vectors transformed by a query function of the ML model, wherein the attention matrix comprises N vectors corresponding to a first dimension of the attention matrix, wherein each respective vector of the N vectors comprises K values corresponding to a second dimension of the attention matrix, and wherein the slot attention calculator is configured to normalize each respective value of the K values of each respective vector of the N vectors of the attention matrix with respect to the K values of the respective vector;

determining, using a slot update calculator of the ML model, an update matrix based on (i) the plurality of feature vectors transformed by a value function of the ML model and (ii) the attention matrix;

updating values of the plurality of slot vectors based on the update matrix and using the neural network memory unit of the ML model, wherein the neural network memory unit is configured to provide the updated values of the plurality of slot vectors as input to the query function for a subsequent iteration of the plurality of iterations;

determining, by the ML model, a task-specific output based on the updated values of the plurality of slot vectors; and performing a downstream task on one or more entities contained in the input data based on the task-specific output.

19. A non-transitory computer-readable storage medium having stored thereon instruction for generating entity-centric representations for performing downstream tasks, the instructions, when executed by a computing system, cause the computing system to perform operations comprising:

providing, to a machine learning (ML) model executed by the computing system, a plurality of feature vectors comprising N feature vectors that represent features of an input data;

initializing a plurality of slot vectors represented by a neural network memory unit of the ML model and comprising K slot vectors, wherein initializing the plurality of slot vectors comprises determining initial values for the plurality of slot vectors;

determining updated values of the plurality of slot vectors by executing a plurality of iterations of the ML model in which the ML model processes the plurality of feature vectors and the plurality of slot vectors, wherein the plurality of iterations cause each respective slot vector of the plurality of slot vectors to converge to representing a corresponding entity contained in the input data by replacing the initial values with the updated values during the plurality of iterations, and wherein each respective iteration of the plurality of iterations comprises:

determining, using a slot attention calculator of the ML model, an attention matrix based on a product of (i) the plurality of feature vectors transformed by a key function of the ML model and (ii) the plurality of slot vectors transformed by a query function of the ML model, wherein the attention matrix comprises N vectors corresponding to a first dimension of the attention matrix, wherein each respective vector of the N vectors comprises K values corresponding to a second dimension of the attention matrix, and wherein the slot attention calculator is configured to normalize each respective value of the K values of each respective vector of the N vectors of the attention matrix is normalized with respect to the K values of the respective vector;

determining, using a slot update calculator of the ML model, an update matrix based on (i) the plurality of feature vectors transformed by a value function of the ML model and (ii) the attention matrix;

updating values of the plurality of slot vectors based on the update matrix and using the neural network memory unit of the ML model, wherein the neural network memory unit is configured to provide the updated values of the plurality of slot vectors as input to the query function for a subsequent iteration of the plurality of iterations;

determining, by the ML model, a task-specific output based on the updated values of the plurality of slot vectors; and performing a downstream task on one or more entities contained in the input data based on the task-specific output.

20. The computer-implemented method of claim 1, wherein the task-specific output represents one or more task-specific attributes of the one or more entities contained in the input data, and wherein performing the downstream task comprises:

causing a device to interact with an environment represented by the input data.

* * * * *